United States Patent [19]

Hirose

[11] Patent Number: 5,255,364
[45] Date of Patent: Oct. 19, 1993

[54] ELECTRONIC FILING SYSTEM WHEREIN THE AUTOMATIC UPDATING OF RETRIEVAL DATA IS VOLUNTARILY INHIBITED

[75] Inventor: Kenji Hirose, Yokohama, Japan

[73] Assignee: Kabushiki Kaisha Toshiba, Kawasaki, Japan

[21] Appl. No.: 605,367

[22] Filed: Oct. 30, 1990

[30] Foreign Application Priority Data

Oct. 31, 1989 [JP] Japan .................................. 1-281733

[51] Int. Cl.⁵ ............................................. G06F 15/20
[52] U.S. Cl. ................................... 395/164; 395/144; 395/600; 345/201
[58] Field of Search ............... 395/144, 145, 164, 600; 340/799

[56] References Cited

U.S. PATENT DOCUMENTS

| | | | |
|---|---|---|---|
| 4,604,653 | 8/1986 | Shimizu | 395/145 |
| 4,868,733 | 9/1989 | Fujisawa et al. | 395/600 |
| 4,931,957 | 6/1990 | Takagi et al. | 395/164 |
| 4,942,479 | 7/1990 | Kanno | 358/448 |
| 5,047,868 | 9/1991 | Takeda et al. | 358/335 |

OTHER PUBLICATIONS

"WordPerfect Manual, Version 5.1" by WordPerfect Corporation Mar. 1990, pp. 208-211, 380-388, 398-402.

Primary Examiner—Dale M. Shaw
Assistant Examiner—Kee M. Tung
Attorney, Agent, or Firm—Finnegan, Henderson, Farabow, Garrett & Dunner

[57] ABSTRACT

Before an optical disk is inserted into an electronic filing system, one of three mode-setting keys provided on a keyboard is pushed, thereby setting an automatic mode for permitting automatic updating of retrieval data items, an inhibit mode for inhibiting the automatic updating of retrieval data items, and a select mode for selecting the automatic updating of retrieval data items or the inhibition thereof. The mode, thus set, is recorded on a magnetic disk. When the optical disk is inserted into the system, the mode is read from the magnetic disk. The mode read from the magnetic disk controls the updating of the retrieval data items recorded on the magnetic disk.

11 Claims, 14 Drawing Sheets

|  | KEY 1 | KEY 2 |
| --- | --- | --- |
| TITLE NO. | SECTION | NAME |
| 1 | YDF | JOHNES |
| 2 | YDF | SMITH |
| ⋮ | ⋮ | ⋮ |

| TITLE NO. | PAGE NO. | REC. NO. | ADDR. NO. | SIZE |
| --- | --- | --- | --- | --- |
| 1 | 1 | 1 | 0 | A4 |
| 1 | 2 | 2 | 100 | A5 |
| 2 | 1 | 3 | 150 | B4 |
| | | | | |

| BINDER NO. | KEY NO. | KEY ATTRI. | LENGTH | NAME |
| --- | --- | --- | --- | --- |
| 1 | 1 | 0 | | |
| 1 | 2 | 0 | | |
| 1 | 3 | 1 | | |
| 1 | 4 | 2 | | |
| 11 | 1 | 0 | 10 | KEY 1 |
| 11 | 2 | 1 | 15 | KEY 2 |
| 12 | 1 | 0 | 10 | KEY 1 |
| 12 | 1 | 0 | 15 | KEY 2 |
| 2 | 1 | 0 | 10 | KEY 1 |
| 2 | 2 | 1 | 15 | KEY 2 |
| | | | | |

| | a: BINDER NUMBER AREA | b: BINDER TYPE AREA | c: BINDER NAME AREA | d: TITLE-FORMAT CHANGE ATTRIBUTE AREA | e: TITLE TABLE PRESENCE/ABSENCE AREA | f: PAGE TABLE PRESENCE/ABSENCE AREA | g: UP-DATA ATTRIBUTE AREA | h: AUTO-ERASE ATTRIBUTE AREA | i: NUMBER-OF-KEY AREA | j: BINDER-DEFINING DATE AREA | k: TITLE-STORAGE FORMAT AREA |
|---|---|---|---|---|---|---|---|---|---|---|---|
| | 1 | 0 | ----- | 2 | 1 | 1 | 2 | 1 | 2 | 89.1.1 | 1 |
| | 2 | 0 | ----- | 0 | 1 | 1 | 1 | 0 | 2 | 89.1.1 | 1 |
| | ----- | ----- | ----- | ----- | ----- | ----- | ----- | ----- | ----- | ----- | ----- |
| | 8 | 0 | ----- | 1 | 2 | 2 | 2 | 1 | 2 | 89.1.1 | 1 |
| | 11 | 2 | ----- | 0 | 1 | 1 | 1 | 0 | 2 | 89.1.1 | 0 |
| | 12 | 2 | ----- | 0 | 1 | 1 | 1 | 0 | 2 | 89.1.1 | 0 |

| BINDER NUMBER AREA | BINDER TYPE AREA | BINDER NAME AREA | TITLE-FORMAT CHANGE ATTRIBUTE AREA | TITLE TABLE PRESENCE/ABSENCE AREA | PAGE TABLE PRESENCE/ABSENCE AREA | UP-DATA ATTRIBUTE AREA | AUTO-ERASE ATTRIBUTE AREA | NUMBER-OF-KEY AREA | BINDER-DEFINING DATE AREA | TITLE-STORAGE FORMAT AREA |
|---|---|---|---|---|---|---|---|---|---|---|
| 1 | 0 | | 2 | 1 | 1 | 2 | 1 | 2 | 89.1.1 | 1 |
| 2 | 0 | | 0 | 1 | 1 | 1 | 0 | 3 | 89.1.1 | 1 |
| ----- | ----- | ----- | ----- | ----- | ----- | ----- | ----- | ----- | ----- | ----- |
| 8 | 0 | | 1 | 2 | 2 | 2 | 1 | 2 | 89.1.1 | 1 |
| | | | | | | | | | | |
| 11 | 2 | | 0 | 1 | 1 | 1 | 0 | 3 | 89.1.1 | 0 |
| 12 | 2 | | 0 | 1 | 1 | 1 | 0 | 3 | 89.1.1 | 0 |

65

60

| TITLE NO. | KEY 1 SECTION | KEY 2 NAME | KEY 3 |
|---|---|---|---|
| 1 | YDF | JOHNES | |
| 2 | YDF | SMITH | |
| ⋮ | ⋮ | ⋮ | ⋮ |

| BINDER NO. | KEY NO. | KEY ATTRI. | LENGTH | NAME |
|---|---|---|---|---|
| 1 | 1 | 0 | | |
| 1 | 2 | 0 | | |
| 1 | 3 | 1 | | |
| 1 | 4 | 2 | | |
| 11 | 1 | 0 | 10 | KEY 1 |
| 11 | 2 | 1 | 15 | KEY 2 |
| 12 | 1 | 0 | 10 | KEY 1 |
| 12 | 2 | 1 | 15 | KEY 2 |
| 2 | 1 | 0 | 10 | KEY 1 |
| 2 | 2 | 1 | 15 | KEY 2 |
| 2 | 3 | 2 | 10 | KEY 3 |
| 11 | 3 | 2 | 10 | KEY 3 |
| 12 | 3 | 2 | 10 | KEY 3 |

FIG. 12

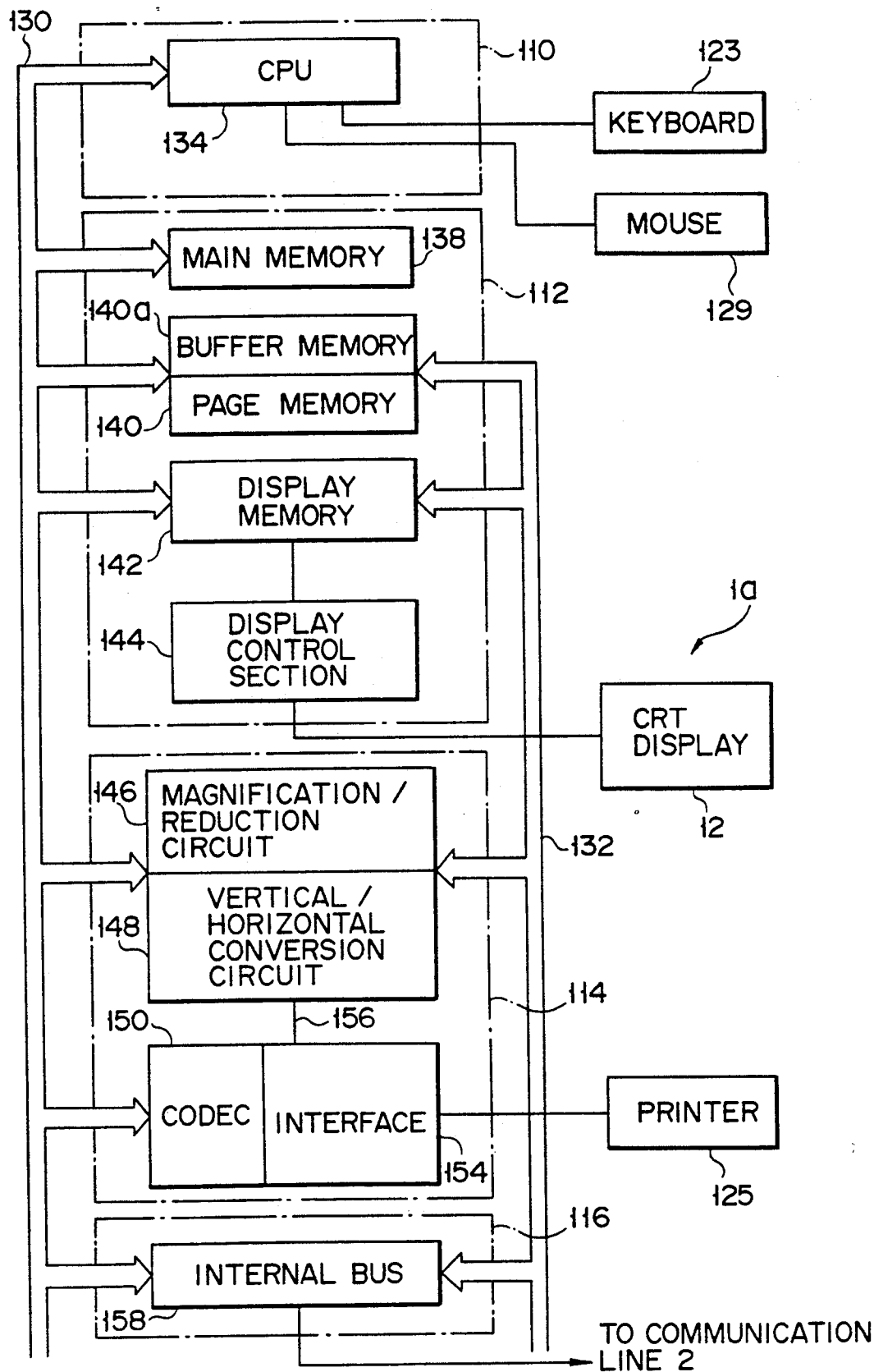
F I G. 13

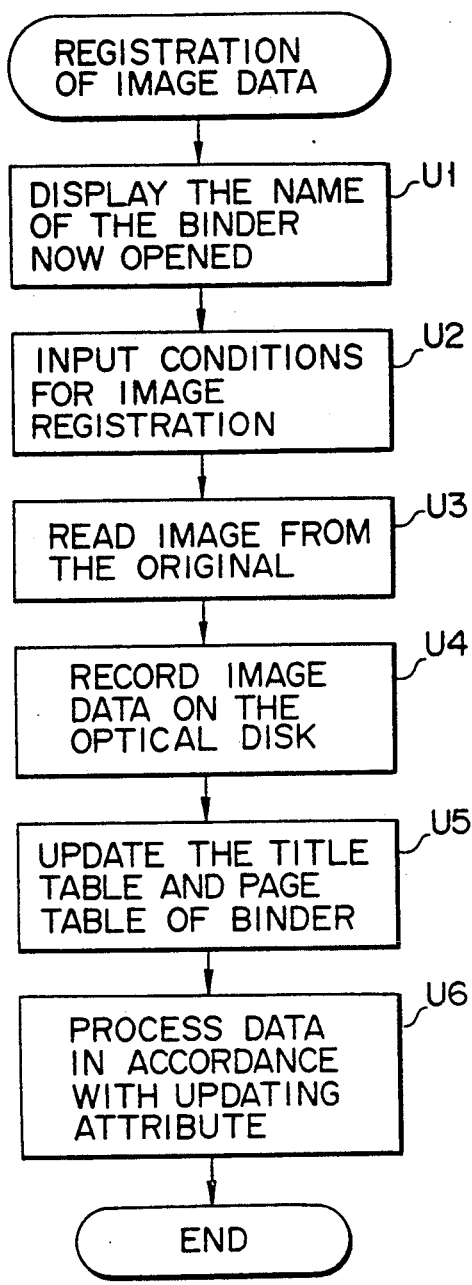
F I G. 14
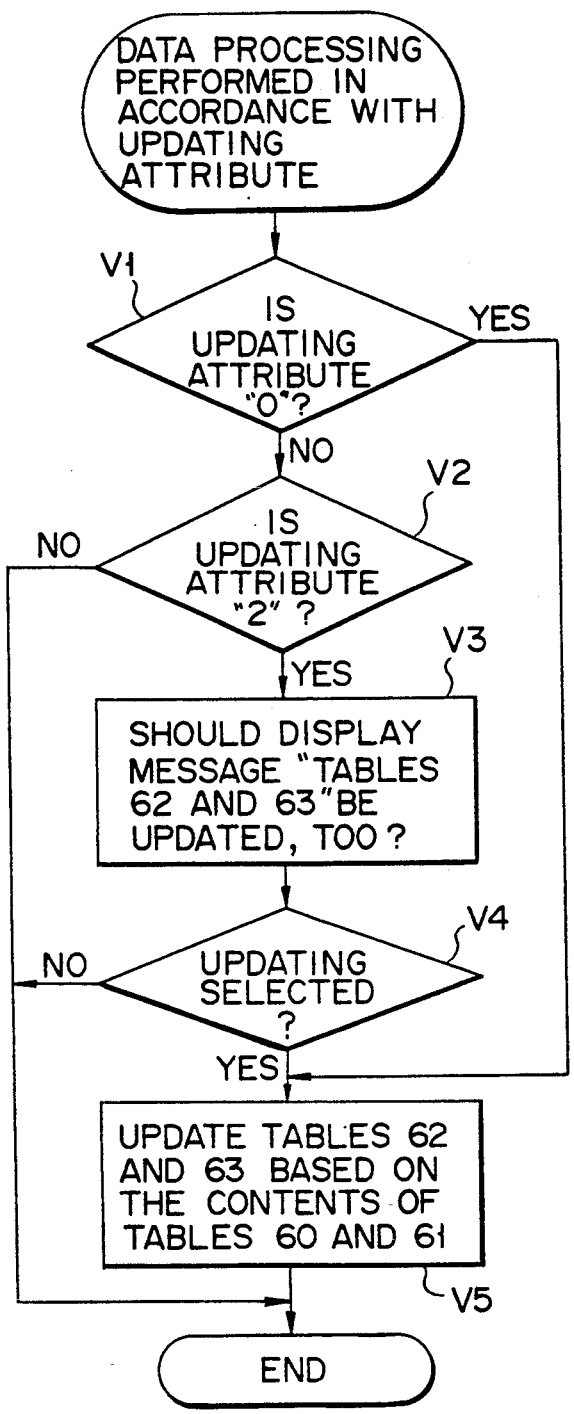
F I G. 15

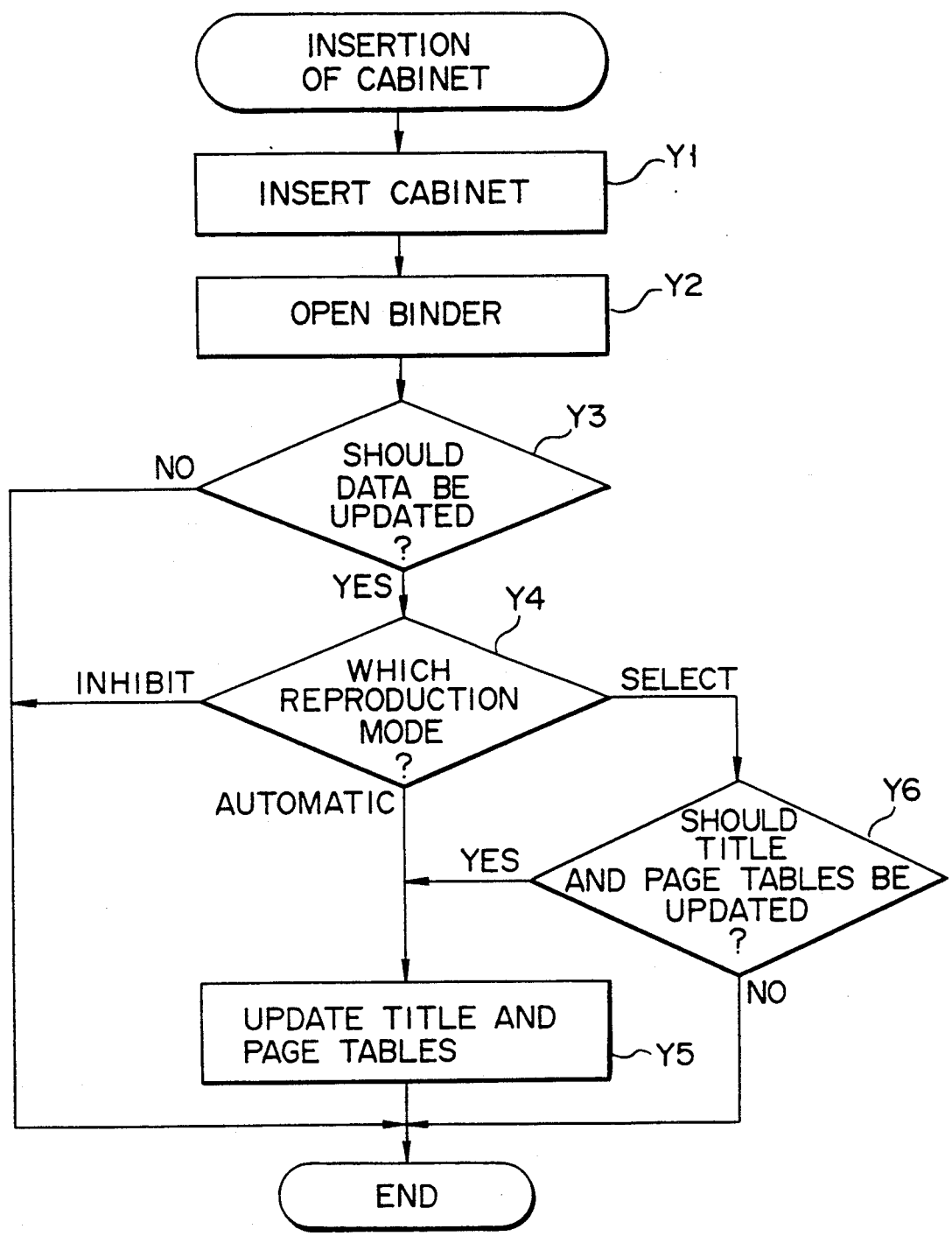
F I G. 18

000
ELECTRONIC FILING SYSTEM WHEREIN THE AUTOMATIC UPDATING OF RETRIEVAL DATA IS VOLUNTARILY INHIBITED

BACKGROUND OF THE INVENTION

1. Field of the Invention

The present invention relates to an electronic filing system in which the automatic updating of retrieval data is voluntarily inhibited.

2. Description of the Related Art

In recent years, an image filing system has been put to practical use. This system comprises a scanner (i.e., a two-dimensional scanning device), an optical disk device, and an output device such as a CRT display or a printer. The scanner reads images from documents prepared in great quantities. The optical disk device stores the data representing the images read from the documents. Whenever necessary, any image data desired is retrieved from the optical disk. The output device displays the image data or prints it out, so that anyone authorized i.e. an operator can see or read the data.

Items of image data are recorded on an optical disk, in the form of four hierarchical classes, i.e., cabinets, binders, documents, and pages. Specific keys are assigned to each of the cabinets, binders, documents and pages. A plurality of keys assigned to the individual binders, are unified and recorded on a magnetic disk as a retrieval data item including title tables and page tables. To retrieve any one of the image data items from the optical disk device, an operator inputs, to the filing system, the retrieval data item assigned to the binder containing that image data item. In response to the retrieval data item thus input, desired image data designated by the retrieval data item can be retrieval from the optical disk device.

To retrieve image data from a desired binder, an operator inserts the optical disk into the optical disk device and then opens the binder. Then, the filing system automatically compares the history data stored in the optical disk with the contents of the title table and also those of the page table, both corresponding to the opened binder and recorded on the magnetic disk. If image data items have been added to, or erased from the optical disk, by means of another filing system, the history data is different from the contents of both tables recorded on the magnetic disk. In this case, the electronic filing system automatically updates both tables in accordance with the history data. The title table and the page table can be updated within a relatively short time if the opened binder contains only a few documents. However, if the binder contains a great number of documents, a considerably long time is required to update these tables. In this case, the operator must wait for that long time before he or she can retrieve any desired image data item from the binder, even if the operator wishes to retrieve an item of image data using non-updated retrieval data.

Accordingly it is demanded that an electronic filing system be developed, which updates or does not update the title table and page table recorded on the magnetic disk at the discretion of an operator, when operator inserts the optical disk into the disk device and opens the binder.

SUMMARY OF THE INVENTION

It is accordingly the object of the present invention to provide an electronic filing system in which the retrieval data items recorded on one recording medium can either be automatically updated or not updated at the discretion of an operator, when the operator opens a desired one of the binders recorded on another recording medium.

According to the invention, there is provided an electronic filing system for retrieving images recorded on a recording medium by using retrieval data which is updated in accordance with change of the images, comprising: mode selecting means for selecting one of first, second and third image reproduction modes; determining means for determining whether or not memory contents recorded on the recording medium have been changed by another electronic filing system; and data processing means for inhibiting updating of the retrieval data when said mode selecting means selects the first mode, for updating the retrieval data when said mode selecting means select the second mode, and for inhibiting or permitting the updating of the retrieval data when said mode selecting means selects the third mode, provided that said determining means determines that the memory contents of the recording medium have been changed.

In the electronic filing system according to the invention, a plurality of images are recorded on a recording medium, and a plurality of retrieval data items are assigned to the individual images. The mode-selecting means selects one of three modes, an inhibit mode, an automatic mode, and a select mode. The determination means determines, whether or not the memory contents of the recording medium have been changed by another electronic filing system. If the determination means determines that the memory contents of the recording medium have been changed, the data processing means inhibits the updating of the retrieval data when the mode-selecting means selects the inhibit mode, it updates the retrieval data items when the mode-selecting means selects the automatic mode, and it inhibits or permits the updating of the retrieval data items when the mode-selecting means selects the select mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

The accompanying drawings illustrate an electronic filing system according to the present invention, in which:

FIG. 4 shows a format of the title controlling table stored in the filing system;

FIG. 5 represents a format of the page table stored in the filing system;

FIG. 6 illustrates a format of the title-format controlling table stored in the filing system;

FIG. 7 shows a format of the binder controlling table stored in the filing system;

FIG. 10 shows another format of the binder controlling table;

FIG. 11 shows another format of the title controlling table;

FIG. 12 represents another format of the title-controlling table;

FIG. 13 is a block diagram schematically showing each of the terminal devices incorporated in the filing system;

FIG. 14 is a flow chart explaining how to register image data;

FIG. 15 is a flow chart explaining the data-processing related to updating attribute;

FIG. 18 is a flow chart explaining the sequence of operations performed when a cabinet-recorded medium is inserted in the optical disk device incorporated in the central device.

DETAILED DESCRIPTION OF THE PREFERRED EMBODIMENTS

One embodiment of the present invention, i.e., an electronic filing system, will now be described in detail, with reference to the accompanying drawings.

Figure 1:
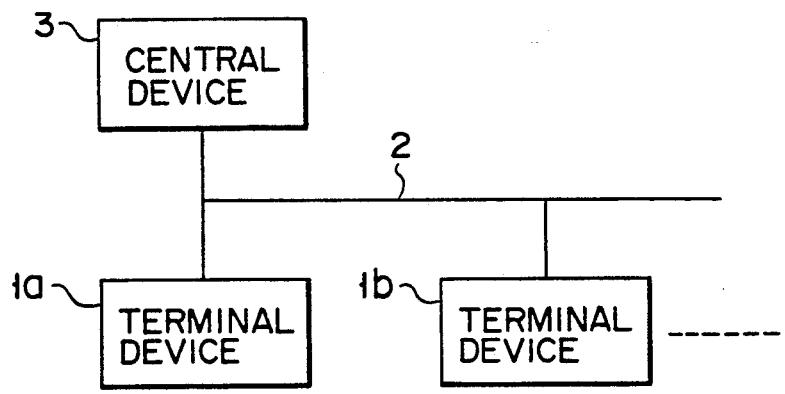
FIG. 1 is a block diagram representing the basic structure of the electronic filing system.

FIG. 1 illustrates the electronic filing system. As this figure shows, the system comprises a plurality of terminal devices 1a, 1b, ..., a communication line 2, and a central device 3 to which the terminal devices are connected by means of the communication line 2.

Figure 2:
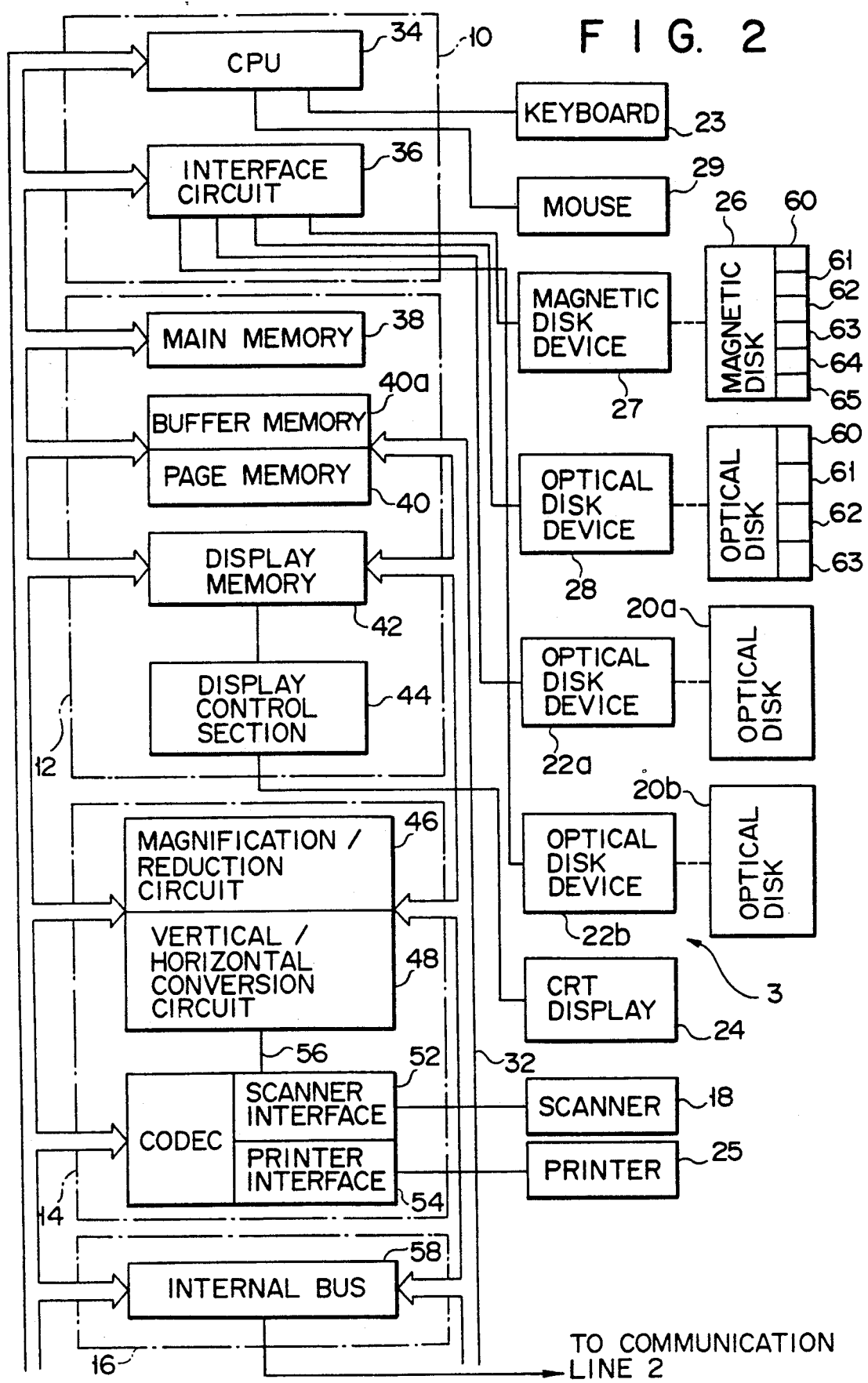
FIG. 2 is a block diagram schematically showing the central device of the system.

As is shown in FIG. 2, the central device 3 comprises a control module 10, a memory module 12, an image-processing module 14, a communication control module 16, a scanner 18, optical disks 20a and 20b, an optical disk 21, optical disk devices 22a and 22b, a keyboard 23, a CRT display 24, a printer 25, a magnetic disk 26, a magnetic disk device 27, an optical disk device 28, a mouse 29, a system bus 30, and an image-data bus 32.

The control module 10 includes a CPU 34 for controlling the recording, retrieving and editing of image data, and an interface circuit 36 for connecting the CPU 34 to the optical disk devices 22a, 22b and 28 and also to the magnetic disk device 27. The keyboard 23 and the mouse 28 are connected to the CPU 34. The CPU 34 is connected to the CPUs 134 (See FIG. 13) incorporated in the terminal devices 1a, 1b, ..., for performing various application operations in response to the requests made by the terminal devices 1a, 1b, .... For instance, upon receipt of a data-retrieving request supplied from any terminal device, the CPU 34 stops recording, retrieving or erasing image data, and starts retrieving the image data which the operator at the terminal device requires. However, the terminal device cannot have an access to the binder which is currently accessed by the CPU 34.

The memory module 12 includes a main memory 38, a page memory 40, a buffer memory 40a, a display memory 42, and a display control section 44. The main memory 38 is used to store various control programs for storing, retrieving and editing image data, control data, and the like. The page memory 40 has a capacity of storing several pages of A4-size documents and is used as an image-data memory. The display memory 42 functions as a display interface. The display control section 44 is designed to control the displaying of image data. Part of the page memory 40 is the buffer memory 40a. The page memory 40 temporarily stores the image data to be recorded on the optical disk 20a or 20b, or the image data read from the optical disk 20a or 20b. The display memory 42 is used for temporary storage of the image data which the CRT display 24 will display. More specifically, it stores the image data read from the page memory 40 or the buffer memory 40a, which represents a magnified image, a reduced image, a rotated image, an image-inserted image, an black-white reversed image, or the like processed in the image-processing module 14.

The image-processing module 14 comprises a magnification/reduction circuit 46, a vertical/horizontal conversion circuit 48, and a compression/expansion circuit (CODEC) 50, a scanner interface 52, a printer interface 54, and an internal bus 56. The magnification/reduction circuit 46 processes image data into one representing a magnified image or a reduced image. The vertical/horizontal conversion circuit 48 processes image data into one representing a 90°-rotated image. The CODEC 50 encodes image data to compress image data (or decreasing the redundancy of data), and decodes image data to expanded image data (or restoring the redundancy of data). The scanner interface 52 is connected to the optical scanner 18 for temporarily storing the image data supplied therefrom. The printer interface 54 is connected to the printer 25 for temporarily storing the image data to be supplied to the printer 25. The internal bus 56 connects the circuits 46, 48 and 50 and the interfaces 52 and 54. The circuit 50 is designed to operate in MH (Modified Huffman) mode or MR (Modified Read) mode, thereby performing band compression or band expansion.

The communication control module 16 includes a communication interface 58, such as a BCP (Bus Communication Processor), connected to, for example, a LAN (Local Area Network). Alternatively, the module 16 can comprise a UCP (Universal Communication Processor) connected by an interface with an external device such as an FCP (Facsimile Connection Processor) or a personal computer. The communication control module 16 is connected by the communication line 2 to the terminal devices 1a, 1b, ..., for supplying a retrieval code, which has been transmitted from any terminal device, to the main memory 38, and for transmitting, in response to this code, image data to the terminal device.

The system bus 30 connects the control module 10, the memory module 12, the image-processing module 14, and the communication control module 16. It is provided for supplying various control signals to some components of the central device 3. The image bus 32 is for the image data and connects the modules 12, 14 and 16.

The scanner device 18 is, for example, a two-dimensional scanning device. It applies a laser beam to an original document sheet, thereby achieving two-dimensional scanning, and converts the light reflected from the sheet, into electrical signals which represent the image formed on the original document sheet.

The optical disk device 22a or 22b receives the image data output by the scanner 18 and record this data on the optical disk 20a or 20b. The device 22a or 22b also receives a retrieval data item input by operating the keyboard 23 or the mouse 29 and retrieve from the optical disk 20a or 20b the image data designated by the retrieval data item. An automatic changer (not shown) is coupled to both optical disk devices 22a and 22b, for inserting an optical disk into the device 22a or the device 22b.

The keyboard 23 is connected to the CPU 34. It is operated to input the CPU 34 retrieval data items designating individual image data items recorded on the optical disk 20a or 20b, and various commands such as a storage command, a retrieval command, and an edition command. The mouse 29 is connected to the CPU 34 and is operated to move a cursor (not shown) in any desired direction on the screen of the CRT display 24, thereby to select one of the operation modes, one of the image regions, or one of icons—all displayed on the CRT screen.

The CRT (Cathode-Ray Tube) display 24 is provided for displaying the image the scanner 18 has read from an original document sheet, or the image retrieved from the optical disk 20a or 20b. It also displays icons on the upper edge, lower edge, and right edge of its screen. The CRT display 24 is a multi-window display capable of displaying two images in two windows or four images in four windows, at the same time. The images, simultaneously displayed, can independently be subjected to various editing processes, such as magnification, reduction, rotation, or scrolling.

The printer 25 prints, on sheets of paper, the image read by the scanner 18, the image retrieved from the disk 20a or 20b, or the image being displayed by the CRT display 24, thus forming a hard copy of the image data.

The magnetic disk device 27 records various control programs on the magnetic disk 26 inserted in it. The device 27 also records four types of data items on the magnetic disk 26. The first type are the retrieval data items input from the keyboard 23. The second type are the address data items representing the memory addresses of the optical disk 20a or 20b at which the image data items corresponding to the retrieval data items are stored. The third type are the image-size data items representing the sizes of the images read by the scanner 18. The fourth type are control data items for controlling the title format and the binders.

The optical disk device 28 has an optical disk 21 inserted in it. The disk 21 is a rewritable one. It is on this rewritable optical disk 21 that the device 28 records retrieval data items, address data items, image-size data items, and control data items similar to those recorded on the magnetic disk 26.

Figure 3:
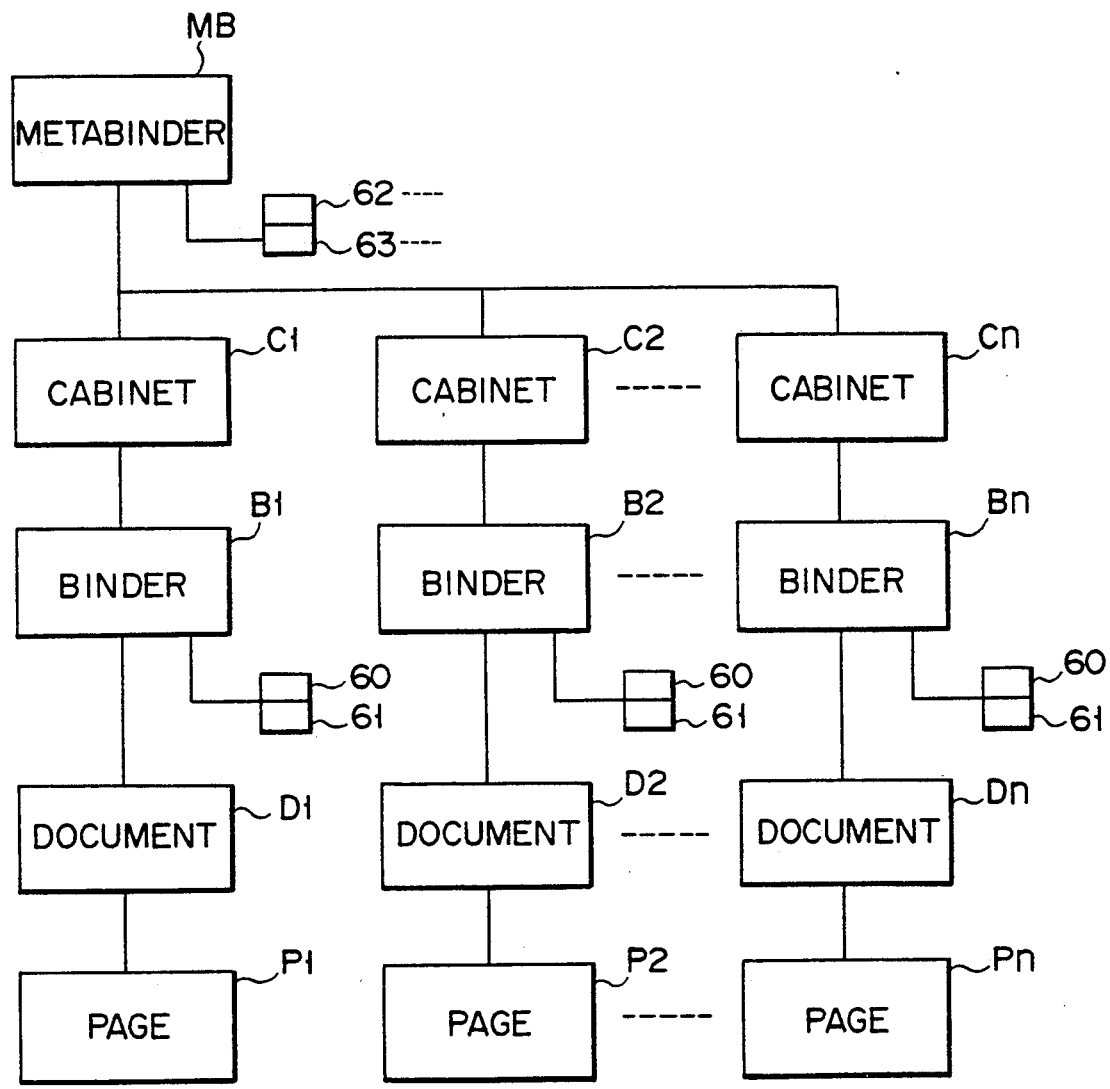
FIG. 3 is a diagram explaining the document-controlling system incorporated in the filing system having four hierarchical classes.

In the electronic filing system, the document data is controlled in a specific method, which will be explained with reference to FIG. 3. As is shown in FIG. 3, the data items representing document images are recorded on the optical disk 20a or 20b in the form of five hierarchical classes, i.e., a metabinder MB, cabinets C1, C2, . . . Cn, binders B1, B2, . . . Bn, documents D1, D2, . . . Dn, and pages P1, P2, . . . Pn. Each cabinet corresponds to one side of an optical disk, and can contain eight binders at most. Each of the binders can contain 30,000 documents at most. Each document can consist of 4,095 pages at most.

Each document has a title of its own, which is of the same format as those of any other documents contained in the same binder. Also, a document can have a summary or a brief explanation of the contents of the document. It should be noted that a document is the basic unit of data to be filed. In other words, the electronic filing system files image data items in units of documents.

As is shown in FIG. 3, a title table 60 and a page table 61 are added to each of the binders B1, B2, . . . Bn.

The title table 60 consists of three columns as is shown in FIG. 4. The serial numbers of the titles corresponding to image names are recorded in the first column. The first retrieval key for each title is a joining section and is recorded in the second column. The second retrieval key for each title is a person's name and is recorded in the third column.

The page table 61 consists of five columns as is shown in FIG. 5. The title numbers are recorded in the first column. The page numbers of each document are recorded in the second column. The record numbers, i.e., the serial numbers assigned to all pages of the documents contained in the binder, are recorded in the third column. The addresses (or record-starting positions) on the disk 20a or 20b, at which the pages are recorded, are recorded in the fourth column. The document sizes or image sizes of the pages are recorded in the fifth column. The memory addresses are logic ones, from which physical track addresses and physical sector addresses are calculated in order to achieve an access to the optical disk 20a or 20b.

As is illustrated in FIG. 3, a title-controlling table 62 and a page-controlling table 63 corresponding to the tables 60, . . . and 61, . . . are added to the metabinder MB. The tables 60, 61, 62 and 63 are recorded on either the optical disk 21 or the magnetic disk 26. The title-controlling table 62 is a collection of the title pages 60 added to the binders B1, B2, . . . Bn. The page-controlling table 63 is a collection of the page tables 61 added to the binders B1, B2, . . . Bn.

Recorded on the magnetic disk 26 are a title-format controlling table 64 and a binder controlling table 65 shown in FIGS. 6 and 7, respectively. The table 64 is referred to, for controlling the formats of the titles shown in the title control tables 60. The table 65 is referred to, for controlling the format of the binders (including the metabinder MB).

As is illustrated in FIG. 6, the title-format controlling table 64 consists of five columns. The numbers of the metabinders/binders are recorded in the first column. The numbers of retrieval keys are recorded in the second column. The attributes of the retrieval keys are recorded in the third column. The lengths of the keys, each representing the number of digits forming a key, are recorded in the fourth column. The names of the retrieval keys are recorded in the fifth column. The attribute of each retrieval key is represented by "0," "1," or "2." When it is "0," the key is a numeral. When it is "1," the key consists of characters. When it is "2," the key consists of Chinese characters.

As is shown in FIG. 7, the binder controlling table 65 consists of ten columns, or ten areas. To be specific, the table 65 consists of: metabinder/binder number area a, metabinder/binder type area b, metabinder/binder name area c, title-format change attribute area d, title table presence/absence area e, page table presence/absence area f, updating attribute area g, auto-erase attribute area h, number-of-key area i, binder-defining date area j, and title-storage format area k.

The serial numbers of the binders (including the metabinder MB) are recorded in the metabinder/binder number area a. Data items are recorded in the metabinder/binder type area b, each showing that the binder is a metabinder if it is "0", showing that the binder is an ordinary one if it is "−1", and showing that the number of the metabinders if it is "1" or a greater integer. The names of the metabinders/binders are recorded in the binder name area c. Title-format change attributes are recorded in the title-format change attribute area d. Each of these attributes shows whether the title format of the metabinder/binder can be changed or not. More specifically, if it is "0," it indicates that the title format cannot be changed; if it is "1," it indicates that the title format of the metabinder can be changed and that those of all binders subject to the metabinder can automatically changed; if it is "2," it indicates that the title format of the metabinder can be selectively changed and that selected ones of the binders subject to the metabinder can be changed.

Data items showing the presence or absence of a title table 60 and a title-controlling table 62 and the location of these tables 60 and 62 are recorded in the title table presence/absence area e. Each of these data items indicates the absence of the tables 60 and 62 if it is "0." If it is "1," it indicates that both tables 60 and 62 are recorded on the magnetic disk 26. If it is "2," it indicates that the tables 60 and 62 are recorded on the optical disk 21.

Data items indicating the presence or absence of the page table 61 and the page-controlling table 63 are recorded in the page table presence/absence area f. Each of these data items indicates the absence of the table 61 and 63 if it is "0." If it is "1," it indicates that both tables 60 and 62 are recorded on the magnetic disk 26. If it is "2," it indicates that the tables 60 and 62 are recorded on the optical disk 21.

Updating attribute is recorded in the updating attribute area g. The updating attribute indicates when the updated binders should be set in the title-controlling table 62 or page-controlling table 63 for the metabinder to which the updated binders are subordinate. If the updating attribute is "0," it indicates that the updated binders should be set in the table 62 or 63 at once. If it is "1," it indicates that the updated binders should be set in the table 62 or 63 at a predetermined time, that is, at the end of a task. If it is "2," it indicates that the updated binders should be set in the table 62 or 63 at a specific time designated by the operator.

Auto-erase attribute is recorded in the auto-erase attribute area h. This attribute indicates whether or not the title-controlling table 62 and page-controlling table 63 of the metabinder, and the title table 60 and page table 61 of ordinary binders may be erased automatically. If the auto-erase attribute is "0," it indicates that these tables can be erased automatically. If it is "1," it indicates that these tables cannot be erased automatically. If it is "2," it indicates that these tables can be erased and have been actually erased automatically.

The number of keys forming a title is recorded in the number-of-key area i. This number is defined by the format of the title. The date of defining each binder is recorded in the binder-defining date area j. Title-storage format data is recorded in the title-storage format area k. The title-storage format data indicates whether the titles are stored in the order they have been registered, or in alphabetical order. If it is "0," it indicates that the titles should be stored in the registering order. If it is "1," it indicates that the titles should be stored in alphabetical order.

It will now be explained how to define title format, with reference to the title-format controlling table 64 illustrated in FIG. 6. As is shown in FIG. 6, key number 1, a key-attribute value, a key 1 having a 10-digit length are assigned to a metabinder 2. Key number 2, a key-attribute character, and a key 2 having a 15-digit length are assigned to another metabinder 2. Key number 1, a key-attribute value, a key 1 having a 10-digit length are assigned to a binder 11 and also to a binder 12. Key number 2, a key-attribute character, and a key 2 having a 15-digit length are assigned to another binder 11 and also to another binder 12. Binders 11 and 12 are subordinate to metabinder 2, and have the same title format.

Figure 8:
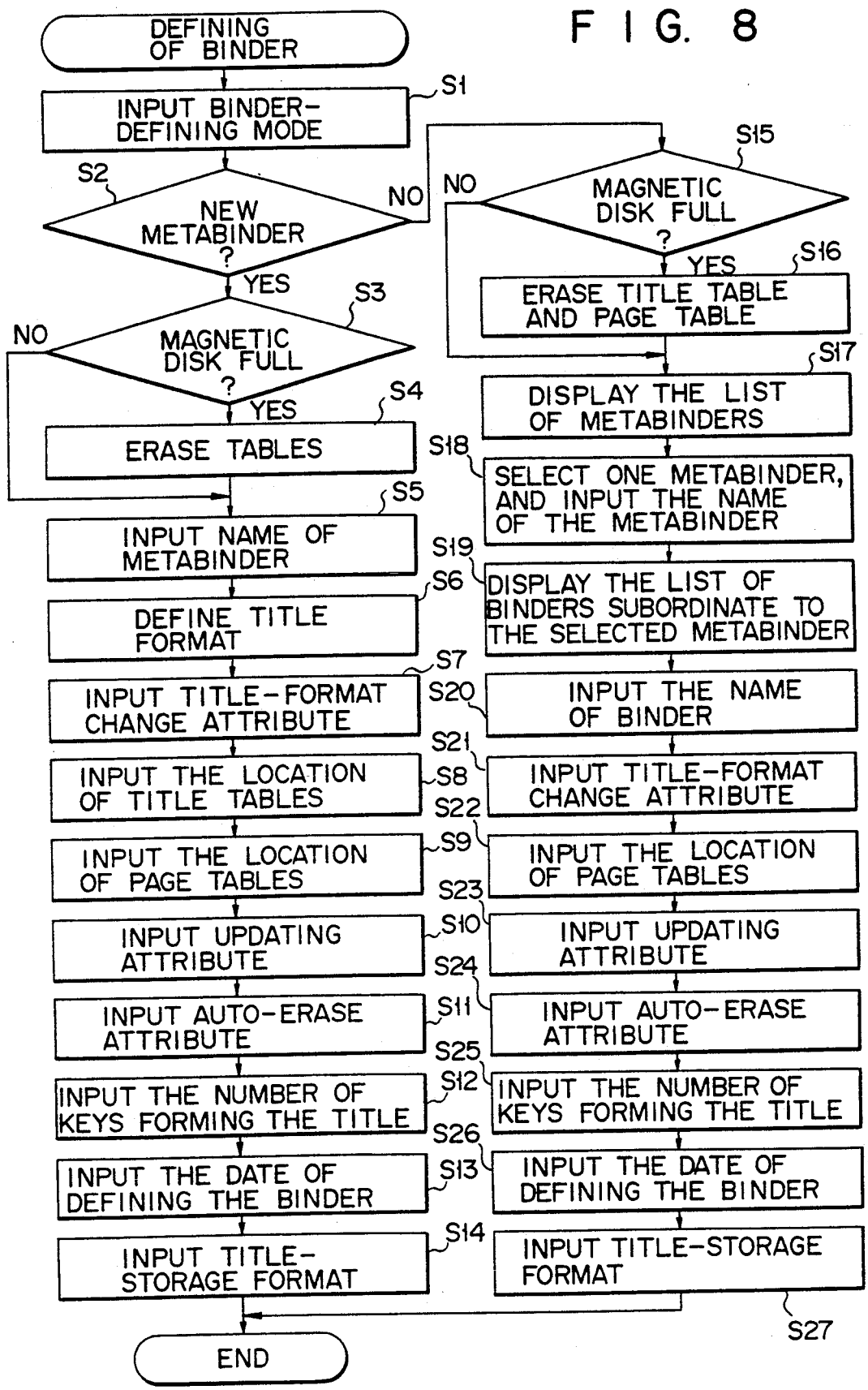
FIG. 8 is a flow chart explaining how to define the title format.

With reference to the flow chart of FIG. 8, it will be explained how the title format is defined. First, the operator of the central device 3 (FIG. 2) operates the keyboard 23, thereby setting the device in a binder-defining mode in step S1. The operator further operates the keyboard 23, thus designating a new metabinder to be defined or any metabinder already defined in step S2. If the operator designates a new metabinder, the CPU 34 determines in step S3 whether or not the magnetic disk 26 is full (or overflowing). If the disk 26 is full, the title-controlling table 62 and page-controlling table 63 of the old metabinder, which can be erased, will be erased from the magnetic disk 26 in step S4. More specifically, the CPU 34 selects the binder which is identified as a metabinder by the data item recorded in the area c of the binder-format controlling table 65, whose auto-erase attribute, recorded in the area h of the table 65, is "0," and whose defining date precedes any other date recorded in the area j of the table 65. The CPU 34 then changes the auto-erase attribute of this binder, recorded in the area h, to "2" which indicates that the binder has been erased from the magnetic disk 26. As a result of this, the title-controlling table 62 and page-controlling table 63 of the binder are erased from the disk 25, whereby that area of the disk 26 which is now vacant can be used to record the title-controlling table 62 and page-controlling table 63 of the new metabinder.

Next, in step S5, the CPU 34 causes the CRT display 24 to display an instruction message "INPUT THE NAME OF THE METABINDER." Seeing this message, the operator operates the keyboard 23, thereby inputting a name for the metabinder. The operator further operates the keyboard 23, thereby defining a title format for the metabinder in step S6. For instance, the operator inputs "0" for the attribute of key No. 1, "10" for the length of key No. 1, "key 1" for the name of key No. 1, and also inputs "1" for the attribute of key No. 2, "15" for the length of key No. 2, and "key 2" for the name of key No. 2. The CPU 34 stores the format of the metabinder, thus defined, in the title-format controlling table 64. In this instance, the metabinder is the second one, it is assigned with the metabinder number of "2."

The CPU 34 causes the CRT display 24 to display instruction messages "INPUT TITLE-FORMAT CHANGE ATTRIBUTE," "INPUT THE LOCATION OF TILE TABLES," "INPUT THE LOCATION OF PAGE TABLES," "INPUT UPDATING ATTRIBUTE," "INPUT AUTO-ERASE ATTRIBUTE," "INPUT THE NUMBER OF KEYS FORMING THE TITLE," "INPUT THE DATE OF DEFINING THE BINDER," and "INPUT TITLE-STORAGE FORMAT" in steps S7-S14. In accordance with these messages the operator operates the keyboard 23, inputting "0" for the title-format change attribute, "1" for designating the magnetic disk 26 as the location of the the title table 60 and the title-controlling table 62, "1" for designating the magnetic disk 26 as the location of the page table 61 and the page-controlling table 63, "1" for the updating attribute (i.e., automatic), "0" for the auto-erase attribute (i.e., permitted), "2" for the number of keys forming the title, "89/1/1" for the binder-defining date, and "1" for the title-storage format (i.e., sequential). The CPU 34 records the following items in the respective area of the binder No. 2 row of the binder-format controlling table 65:

(1) "0" in the the binder type area b
(2) "0" in the binder name area c
(3) "0" in the title-format change attribute area d
(4) "1" in the title table presence/absence area e
(5) "1" in the page table presence/absence area f
(6) "1" in the updating attribute area g
(7) "0" in the auto-erase attribute area h
(8) "2" in the number-of-key area i
(9) "89/1/1" in the binder-defining date area j
(10) "1" in the title-storage format area k If the operator designates an old metabinder, the CPU 34 determines whether or not the magnetic disk 26 is full (or overflowing) in step S15. If the disk 26 is full, the title 60 and page table 61 of the old metabinder, which can be erased, will be erased from the magnetic disk 26. More specifically, the CPU 34 selects the binder which is identified as an ordinary binder by the data item recorded in the area c of the binder-format controlling table 65, whose auto-erase attribute, recorded in the area h of the table 65, is "0," and whose defining date precedes any other date recorded in the area j of the table 65. The CPU 34 then changes the auto-erase attribute of this binder, recorded in the area h, to "2" which indicates that the binder has been erased from the magnetic disk 26. As a result of this, the title table 60 and page table 61 of the binder are erased from the disk 25, whereby that area of the disk 26 which is now vacant can be used to record the title table 60 and page table 61 of a new ordinary binder in step S16.

Then, the CPU 34 searches in step S17 the binder-format controlling table 65 for any binder the type of which is identified by the data item of "0" recorded in the binder type area b of the table 65. In other words, the CPU 34 searches for any metabinder, and then retrieves the metabinder from the table 65. The metabinder or metabinders, thus retrieved, are displayed by the CRT display 24. In next step S18, the operator designates the metabinder displayed or selects one of the metabinders displayed, by operating the keyboard 23 or the mouse 29. Alternatively, the operator operates the keyboard 23, thereby inputting the name of a metabinder. Then, the CRT display 24 displays the name of the metabinder the operator has designated or selected is displayed, or the name of the metabinder the operator has input. The CPU 34 causes the CRT display 24 to display an instruction message "INPUT THE NAME OF BINDER." In accordance with this message the operator operates the keyboard 23, thereby inputting the name of the binder.

Next, in step S19, the CPU 34 defines the title format for the binder input, which is identical to the title format of the metabinder. For example, in the case of a binder which is subordinate to the metabinder "2" and whose key number is "1," the title format consists of key attribute of "0," key length of "10," and key name of "key 1." In the case of a binder which is subordinate to the metabinder "2" and whose key number is "2," the title format consists of key attribute of "1," key length of "15," and key name of "key 2." The CPU 34 stores the title format in step S20, thus defined, into the title-format controlling table 64. Since the binder is the eleventh one, it is assigned with the binder number of "11."

The CPU 34 causes the CRT display 24 to display the instruction messages "INPUT TITLE-FORMAT CHANGE ATTRIBUTE," "INPUT THE LOCATION OF TITLE TABLES," "INPUT THE LOCATION OF PAGE TABLES," "INPUT UPDATING ATTRIBUTE," "INPUT AUTO-ERASE ATTRIBUTE," "INPUT THE NUMBER OF KEYS FORMING THE TITLE," "INPUT THE DATE OF DEFINING THE BINDER," "INPUT TITLE-STORAGE FORMAT" in step S21-S27. In accordance with these messages, the operator operates the keyboard 23, inputting "0" for the title-format change attribute, "1" designating the magnetic disk 26 as the location of the title table, "1" designating the magnetic disk 26 as the location of the page table, "0" for the auto-erase attribute, "2" for the number of the keys existing in the title, "89/1/1" for the date of defining the binder, and "0" for the title-storage format.

Figure 9A:
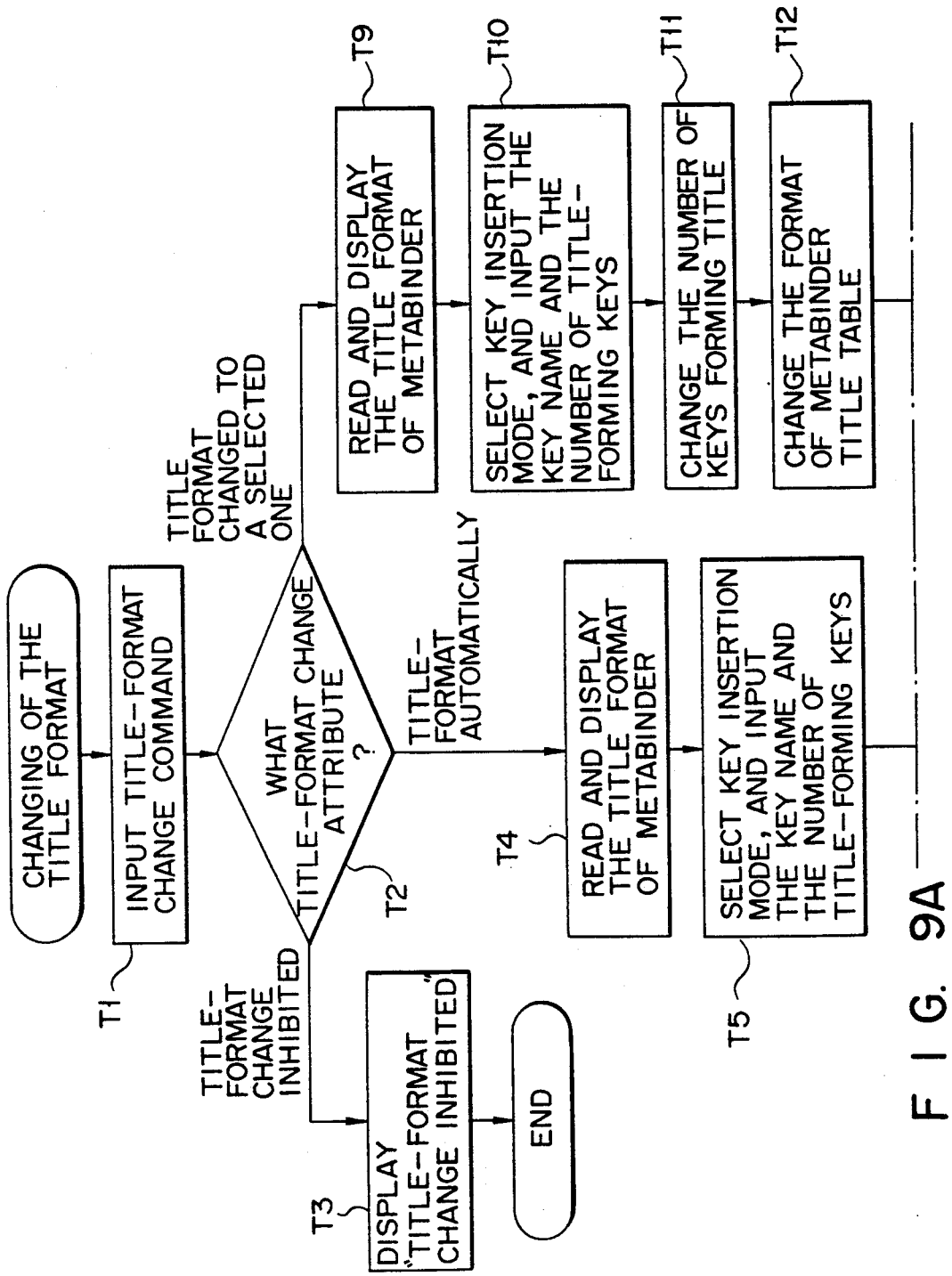
FIGS. 9A and 9B form a flow chart explaining how to change the title format.
Figure 9B:
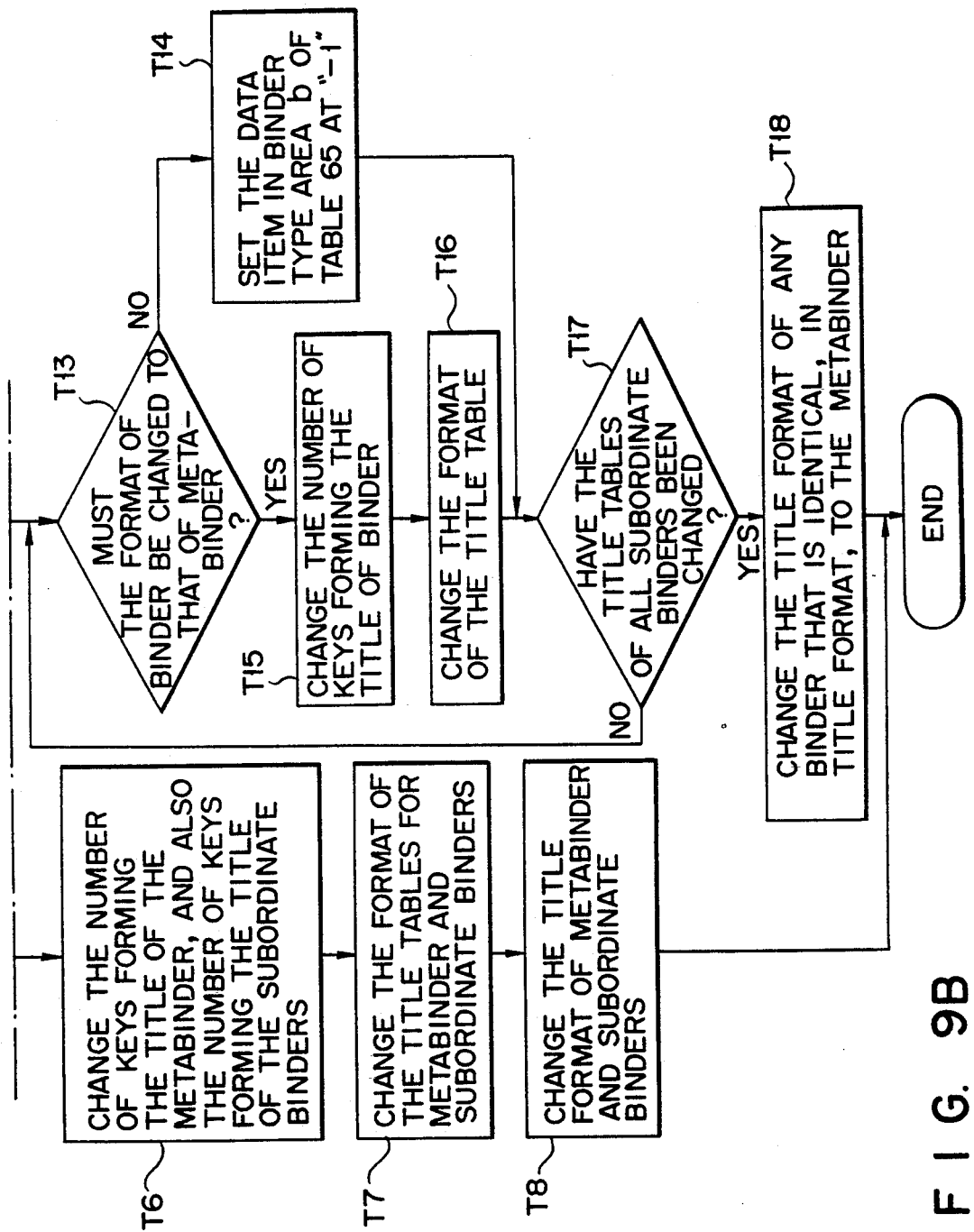

With reference to the flow chart of FIG. 9, it will be explained how to change the title format shown in FIG. 7. First, the operator inputs a command of changing the title format of the metabinder in step T1. The CPU 34 checks the title-format change attribute for the metabinder, which is recorded in the title-format change attribute area d of the binder-format controlling table 65 in step T2. If the title-format change attribute is "0," the CPU 34 causes the CRT display 24 to display the message "CHANGE OF TITLE FORMAT INHIBITED" in step S3. If the title-format change attribute is "1," the title format can be automatically changed. If the title-format change attribute is "2," the title format can be changed to one selected by the operator.

It will first be explained how the title format is changed when the title-format change attribute is "1." The CPU 34 reads the title format of the desired metabinder from the title-format controlling table 64 in step T4, The CRT display 24 displays the title format read from the table binder-format controlling table 65. Seeing the title format displayed on the CRT screen, the operator selects a key-insertion mode, and then inputs the name of the key to be changed, the desired number of keys which will form a new title, and similar data items in step T5. Then, the CPU 34 changes the number of keys recorded in the number-of-key area i of the table 65, for the metabinder and the binders subordinate thereto, to the desired number of keys input by the operator in step T6. Next, the CPU 34 determines whether or not the title table 60 and the title-controlling table 62, and also where these tables 60 and 61, if exist, are recorded, in accordance with the data recorded in the title table presence/absence area e of the binder-format controlling table 65 in step T7. The CPU 34 changes the format of the tables 60 and 62 to those designated by the operator, no matter whether they are recorded on the optical disk 21 or the magnetic disk 62 in step T8. Further, the CPU 34 changes the title format of the metabinder and also that of the binders subordinated to the metabinder.

If the number of keys forming the title of the metabinder "2" is changed from "2" to "3" as is shown in FIG. 10, the number of keys forming the titles of the subordinate binders "11" and "12" is also changed from "2" to "3." Then, the format of the tables 60 and 62, both recorded on the optical disk 21 or the magnetic disk 26, is changed to the new one shown in FIG. 11, which has an additional column for key 3. Further, as is illustrated in FIG. 12, the title format of the key "3" corresponding to the metabinder is added to the title-format controlling table 64, and also the title format of the key "3" corresponding to the subordinate binders "11" and "1" is also added to the title-format controlling table 64.

It will now be explained how the title format is changed when the title-format change attribute is "2." In this case, too, the CPU 34 reads the title format of the desired metabinder from the title-format controlling table 64 in step T9. The CRT display 24 displays the title format read from the table 64. Seeing the title format displayed on the CRT screen, the operator operates the keyboard 23, thereby selecting a key-insertion mode, and then inputting the name of the key to be changed, the desired number of keys which will form a new title, and similar data items in step T10. Then, in step T11, the CPU 34 changes the number of keys recorded in the number-of-key area i of the table 65, for the metabinder and the binders subordinate thereto, to the desired number of keys input by the operator. Next, the CPU 34 determines whether or not the title table 60 and the title-controlling table 62 exist, and also where these tables 60 and 61, if existing, are recorded, in accordance with the data recorded in the title table presence/absence area e of the table 65 in step T12. The CPU 34 changes the format of the table 62 to the format designated by the operator, no matter whether these tables are recorded on the optical disk 21 or the magnetic disk 26.

Next, the CPU 34 causes the CRT display 24 to display the names of the binders subordinate to the metabinder, along with the message "DO YOU WANT TO CHANGE THE FORMAT OF EACH BINDER TO THE SAME FORMAT AS THE METABINDER?" in step T13. If the operator input an "YES" answer by operating the keyboard 23, the CPU 34 changes the number of keys recorded in the number-of-key area i of the table 65 to the value the operator has designated for the metabinder in step T15. Further, the CPU 34 determines whether or not the title table 60 exists, and also where the table 60, if exists, is recorded, in accordance with the data recorded in the title table presence/absence area e of the binder-format controlling table 65. The CPU 34 changes the format of the table 60 to the format designated by the operator, no matter whether these tables are recorded on the optical disk 21 or the magnetic disk 26 in steps T16, T17.

If the operator answers "NO" to the question "DO YOU WANT TO CHANGE THE FORMAT OF EACH BINDER TO THE SAME FORMAT AS THE METABINDER?," the CPU 34 changes the data item recorded in the binder type area b of the table 65 to "−1," whereby any binder is no longer subordinated to the metabinder in step T14.

Then, the CPU 34 changes the title format of the binders which are subordinate to the metabinder and which have the same format as the metabinder in step T18.

When the operator inputs a commend for opening any desired binder after the operator has inserted the optical disk 20a or 20b into the optical disk devices 22a or 22b, the CPU 34 determines that the title table 60 and page table 61 for the desired binder have been automatically erased from the optical disk 21 or the magnetic disk 26, if the auto-erase attribute for the binder is "2." In this case, the CPU 34 reads the history data, i.e., the latest title table 60 and the latest page table 61, from the optical disk 20a or 20b, and records these tables at that locations on the optical disk 21 or the magnetic disk 26 which are represented by the data items recorded in the areas e and f of the binder-format controlling table 65. At the same time, the CPU 34 sets the auto-erase attribute of "1" in the area h for the desired binder. As a result, the title table 60 and the page table 61 are recorded on the optical disk 21 or the magnetic disk 26.

The title-controlling table 62 and page-control ling table 63 for any metabinder can be recorded again on the optical disk 21 or the magnetic disk 26. To record the tables 62 and 63 again on the disk 21 or 26, the operator designates the metabinder. In this case, metabinder has auto-erase attribute of "2," which is recorded in the area h of the binder-format controlling table 65. The CPU 34 determines all binders subordinate to the metabinder, based on the data items recorded in the area b of the binder-format controlling table 65. In other words, the CPU 34 selects the binders identified by the same number as that of the metabinder. Then, the CPU 34 causes the CRT display 24 to display the message "INSERT OPTICAL DISKS STORING THESE BINDERS, INTO THE OPTICAL DISK DEVICES." The operator inserts the disk 20a or 20b into the optical disk devices 22a or 22b. Thereafter, the CPU 34 reads the history data, i.e., latest binder-controlling table and the latest page-controlling table, from the optical disk 20a or 20b, and records these tables at that locations on the optical disk 21 or the magnetic disk 26 which are represented by the data items recorded in the areas e and f of the binder-format controlling table 65. At the same time, the CPU 34 sets the auto-erase attribute of "1" in the area h for the desired binder. As a result, the title-controlling table 62 and the page-controlling table 63 are recorded again on the optical disk 21 or the magnetic disk 26, for all binders subordinate to the desired metabinder.

When the operator inputs a commend for opening any desired binder after he or she has inserted the optical disk 20a or 20b into the optical disk device 22a or 22b, the CPU 34 reads the history data about the binder from the optical disk 20a or 20b if the auto-erase attribute for the binder, which is recorded in the area h of the table 65, is either "0" or "1." Further, the CPU 34 determines whether or not the binder has been recorded on, or erased from, the disk 20a or 20b by means of any other filing system. Let us assume that the binder has been recorded or erased by any other filing system. Then, if the reproduction mode set is the inhibit mode, the CPU 34 inhibits the updating of the title table 60 and page table 61 of the desired binder. If the reproduction mode is the automatic mode, the CPU 34 updates the title table 60 and page table 61 of the binder. If the reproduction mode is the select mode, the CPU 34 causes the CRT display 24 to display the instruction message "DO YOU WANT TO INHIBIT THE UPDATING OF THE BINDER?" If the operator inputs "YES," the CPU 34 inhibits the updating of the tables 60 and 61. In this case, the binder can be retrieved, but cannot be erased; nor can a new binder be registered. If the operator inputs "NO," the CPU 34 updates the tables 60 and 61 which are recorded at that locations on the optical disk 21 or the magnetic disk 26 which are represented by the data items recorded in the areas e and f of the binder-format controlling table 65.

The various reproduction modes, i.e., the inhibit mode, the automatic mode, and the select mode, are present in the electronic filing system.

The terminal devices 1a, 1b, ..., which are identical in structure and designed to transmits a retrieval request to the central device 3, will now be described, with reference to FIG. 13.

As is illustrated, each terminal device comprises a control module 110, a memory module 112, an image-processing module 114, a communication control module 116, a keyboard 123, a printer 125, a mouse 129, a system bus 130, and an image-data bus 132.

The control module 110 has a CPU 134 for retrieving and editing image data. The keyboard 123 and the mouse 129 are connected to the CPU 134. The CPU 134 and the CPU 34 of the central device 3 are connected by the communication line 2. Hence, the terminal device can perform the same data-processing as the central device 3.

The memory module 112 includes a main memory 138, a page memory 140, a display memory 142, and a display control section 144. The main memory 138 is used to store various control programs for storing, retrieving and editing image data, control data, and the like. The page memory 140 has a capacity of storing several pages of A4-size documents and is used as an image-data memory. The display memory 142 functions as a display interface. The display control section 144 is designed to control the displaying of image data. Part of the page memory 140 is a buffer memory 140a. The page memory 140 temporarily stores the image data supplied from the central device 3. The image memory 142 is provided for achieve temporary storage of the image data which the CRT display 124 will display. More specifically, it stores the image data read from the page memory 140 or the buffer memory 40a, which represents a magnified image, a reduced image, a rotated image, an black-white reversed image, or the like.

The image-processing module 114 comprises a magnification/reduction circuit 146, a vertical/horizontal conversion circuit 148, and a compression/expansion circuit (CODEC) 150, a printer interface 154, and an internal bus 156. The magnification/reduction circuit 146 processes image data into one representing a magnified image or a reduced image. The vertical/horizontal conversion circuit 148 processes image data into one representing a rotated image. The CODEC 150 encodes image data to compress image data (or decreasing the redundancy of data), and decoding image data to expand image data (or restoring the redundancy of data). The printer interface 154 is connected to the printer 125 for temporarily storing the image data to be supplied to the printer 125. The internal bus 156 connects the circuits 46, 48 and 50 and the printer interface 54. The circuit 150 is designed to operate in MH (Modified Huffman) mode or MR (Modified Read) mode, thereby performing band compression or band expansion.

The communication control module 116 includes a communication interface 158, such as a BCP (Bus Communication Processor), connected to, for example, a LAN (Local Area Network). Alternatively, the module 116 can comprise a UCP (Universal Communication Processor) connected by an interface with an external device such as an FCP (Facsimile Connection Processor) or a personal computer. The module 116 is connected by the communication line 2 to the the communication module 16 of the central device 3, for supplying retrieval data to the central device 3 and for supplying the image data corresponding to the retrieval data and transmitted from the central device 3, to the display memory 142.

The system bus 130 connects the control module 110, the memory module 112, the image-processing module 114, and the communication control module 116. It is provided for supplying various control signals to some components of the terminal device. The image-data bus 132 connects the memory module 112, the image-processing module 114, and the communication control module 116.

The keyboard 123 is connected to the CPU 134. It is operated to input the CPU 134 various commends such as a retrieval command and an edition command. The mouse 129 is connected to the CPU 134 and is operated to move a cursor (not shown) in any desired direction on the screen of the CRT display 124, thereby to select one of the operation modes, one of the image regions, or one of icons—all displayed on the CRT screen.

The CRT (Cathode-Ray Tube) display 124 is a multi-window display capable of displaying two images in two windows or four images in four windows, at the same time. The images, simultaneously displayed, can independently be subjected to various editing processes, such as magnification, reduction, rotation, or scrolling.

The printer 125 prints, on sheets of paper, the image which the CRT display 124 displays, thereby forming a hard copy of the image data.

With reference to the flow charts of FIGS. 14 to 18, it will now be explained how image data is registered in, and retrieved from, the central device 3.

It will first described how to register image data in FIG. 14. Let us assume the CRT display 24 displays the menu of operations, and a selected optical disk (i.e., a selected cabinet), either the optical disk 20a or 20b, is inserted in the optical disk device 22a or 22b. First, the operator operates the keyboard 23 or the mouse 29, thereby selecting the register mode. Then, the CPU 34 causes the CRT display 24 to display the list of the binders recorded on the optical disk (i.e., the cabinet), along with the instruction message "SELECT THE BINDER YOU WANT TO REGISTER" in step U1. The operator selects the binder he wants to open. The CPU 34 opens the binder selected by the operator, and then determines where the title table 60 and page table 61 of the binder are recorded, the optical disk 21 or the magnetic disk 26, in accordance with the data items recorded in the title table presence/absence area e and page presence/absence area f of the binder-format controlling table 65. As a result, data can be written in both tables 60 and 61. The CPU 34 determines that the title table 60 is recorded on the magnetic disk 26, if the data item recorded in the area e is "1." It determines that the title table 60 is recorded on the optical disk 21, if the data item recorded in the area e is "2."

The CPU 34 reads the history data of the selected binder from the optical disk 20a or 20b. Also it determines whether or not the binder has been recorded on, or erased from, the disk 20a or 20b by means of any other filing system. If NO, the flow goes to the next operation. If YES, the CPU 34 determines which reproduction mode has been set, the inhibit mode, the automatic mode, or the select mode. If the reproduction mode is the inhibit mode, the CPU 34 inhibits the updating of the title table 60 and page table 61 of the desired binder. If the reproduction mode is the automatic mode, the CPU 34 updates the title table 60 and page table 61 of the binder. If the reproduction mode is the select mode, the CPU 34 causes the CRT display 24 to display the instruction message "DO YOU WANT TO INHIBIT THE UPDATING OF THE BINDER?" If the operator inputs "YES," the CPU 34 inhibits the updating of the tables 60 and 61, in which case the binder can be retrieved, but cannot be erased, and no new binders can be registered. If the operator inputs "NO," the CPU 34 updates the tables 60 and 61 which are recorded on either the optical disk 21 or the magnetic disk 26 in accordance with the data items recorded in the areas e and f of the binder-format controlling table 65.

Since neither the title table 60 nor the page table 61 is updated automatically when the reproduction mode is the inhibit mode, it is possible to retrieve image data at one though it is impossible to register image data after the optical disk 20a or 20b has been inserted into the disk device 22a or 22b. When the reproduction mode is the automatic mode, image data can be registered and retrieved whenever desired, after the title table 60 and the page table 61 have been updated. When the reproduction mode is the select mode, the operator can either update the tables 60 and 61 or maintain these tables as they are. In other words, he can retrieve the image data without updating the title table 60 or the page table 61, can register image data and retrieve it after having updated these tables 60 and 61.

The CPU 34 reads the title format of the desired binder from the title-format controlling table 64, and causes the CRT display 24 to display the instruction message "INPUT RETRIEVAL DATA FOR THE IMAGE YOU WANT TO REGISTER" in step U2. In accordance with the message, the operator inputs the retrieval data defining the title format. The CPU 34 checks the title format, thus input, against the formats already defined. If the format is identical to one of the formats already defined, the CPU 34 compares the retrieval data with the retrieval data recorded on the optical disk 20a or 20b, thereby to determine whether or not the binder has already been registered. If NO, the retrieval data is stored into the main memory 38.

Next, the operator sets an original document in the scanner 18 in step U3. Then, the CPU 34 drives the scanner 18 and the optical disk device 22a or 22b. The scanner 18 performs two-dimensional scanning, converting the image data on the original document into electrical image data. The image data is stored, line by line, into the page memory 40. The image data, thus stored into the page memory 40, is supplied to the magnification/reduction circuit 46. The circuit 46 processes the image data into one representing an image magnified or reduced to the size of the screen of the CRT display 24. The image data output by the circuit 46 is stored into a VARM or the like (not shown), whereby the resolution of the image is adjusted. Then, the resolution-adjusted image data is stored into the display memory 42. The CRT display 24 displays the image data stored in the display memory 42.

The operator examines the image displayed on the screen of the CRT display 42, to see whether it is skewed or not, and also whether its density and resolution are satisfactory. If the operator thinks that the image has sufficiently high quality, he inputs a registration command. In response to the registration command, the CPU 34 causes the CODEC 50 to band-compress the image data, line by line, in the MH mode or the MR mode, thereby encoding the image data. The image data, read from the original document and subsequently encoded, is supplied to the optical disk device 22a or 22b, and is recorded on the optical disk 20a or 22b in step U4.

Then, the CPU 34 stores the image data into the main memory 38, along with the retrieval date representative of the logic address and length of the image data. The logic address is defined by the physical address and physical sector address of the optical disk, at which the image data is recorded. The length of the image data is the block length of the data.

Next, the CPU 34 controls the CODEC 50, whereby the CODEC 50 performs band-compression on the image data stored in the display memory 42 and adjusted to the size (i.e., A4-size) in which the CRT display 24 will display the image. More specifically, the CODEC 50 band-compresses this image, line by line, in the MH mode or the MR mode, thereby encoding the image data. The image data, thus encoded, is supplied to the optical disk device 22a or 22b, and is recorded on the optical disk 20a or 22b.

Thereafter, the CPU 34 stores into the main memory 38 the logic address, which is defined by the physical address and physical sector address of the optical disk, in association with the retrieval data.

In a similar way, any other image data read by the scanner 18 can be recorded on the optical disk 20a or 20b, along with the retrieval data assigned to it.

After the image data has been registered, the operator operates the keyboard 23, thereby inputting a binder-closing command. In response to this command, the CPU 34 determines where the title table 60 and page table 61 of the binder are recorded, the optical disk 21 or the magnetic disk 26, in accordance with the data items recorded in the title table presence/absence area e and page presence/absence area f of the binder-format controlling table 65 in step U5.

If the tables 60 and 61 are recorded on the magnetic disk 26, the retrieval data stored in the main memory 38 is supplied to the magnetic disk device 27. The device 27 records the retrieval data in the tables 60 and 61, both recorded on the magnetic disk 26, thus updating these tables. The CPU 34 records the retrieval data items in the title table 60 in the order they have been input if the title-format data recorded in the area k of the title-format controlling table 65 is "0" and indicates that the titles should be stored in the order they have been registered, or in alphabetical order if the title-format data is "1" and indicates that the titles have should be stored in alphabetical order.

If the tables 60 and 61 are recorded on the optical disk 21, the retrieval data stored in the main memory 38 is supplied to the optical disk device 28. The device 28 records the retrieval data in the tables 60 and 61, both recorded on the optical disk 21, thus updating these tables. The retrieval data items are recorded in the title table 60 in the order they have been input if the title-format data recorded in area k of the title-format controlling table 65 is "0" and indicates that the titles should be stored in the order they have been registered, or in alphabetical order if the title-format data is "1" and indicates that the titles have should be stored in alphabetical order.

When the binder is closed, the title table 60 and the page table 61 for the binder, thus updated, are recorded also on the optical disk 20a or 20b and will be used as history data of the binder in step U6.

Further, in FIG. 15, the CPU 34 performs the following operation when the updating attribute, which is recorded in the updating attribute area g of the table 65 is "0," indicating that the updated binder should be set in the table 62 or 63 at once, or when the updating attribute "2," indicating that the updated binders should be set in the table 62 or 63 at a specific time designated by the operator in step V1-V5.

When the updating attribute is "0," the CPU 34 determines the number of a metabinder from the data recorded in the area b of the binder-format controlling table 65. Then, the CPU 34 determines where the title-controlling table 62 for the metabinder is recorded, in accordance with the data recorded in the area e of the table 65. Further, it determines where the page-controlling table 63 for the metabinder is recorded, in accordance with the data recorded in the area f of the table 65. Hence, data can be written in, or read from, the tables 62 and 63. The CPU 34 updates the tables 62 and 63 in accordance with the contents of the title table 60 and the page table 62 which have been updated. The CPU 34 records the retrieval data items in the title-controlling table 62, either in the order they have been input if the title-format data recorded in area k of the table 65 indicates that the titles should be stored in the order they have been registered, or in alphabetical order if the title-format data indicates that the titles have should be stored in alphabetical order.

On the other hand, when updating attribute is "2," the CPU 34 causes the CRT display 24 to display the instruction message "DO YOU WANT TO UPDATE TABLES 62 AND 63 FOR METABINDER, TOO?" If the operator inputs "YES," the CPU 34 updates the title-controlling table 62 and the page-controlling table 63 for the metabinder, in the same way as described above.

It will now be explained how image data is erased from the optical disk 20a or 20b. Let us assume that the operator inserts an optical disk, i.e., a cabinet, into either the optical disk device 22a or 22b, and then operates the keyboard 23, thereby inputting an erase command. In response to the erase command, the CPU 34 causes the CRT display 24 to display the list of the binders recorded on the optical disk (i.e., the cabinet), along with the instruction message "SELECT THE BINDER YOU WANT TO ERASE." The operator selects the binder he wants to erase. The CPU 34 opens the binder selected by the operator, and then determines where the title table 60 and page table 61 of the binder are recorded, in accordance with the data items recorded in the title table presence/absence area e and page presence/absence area f of the binder-format controlling table 65. As a result, data can be written in both tables 60 and 61. The CPU 34 determines that the title table 60 is recorded on the magnetic disk 26, if the data item recorded in the area e is "1." It determines that the title table 60 is recorded on the optical disk 21, if the data item recorded in the area e is "2."

The CPU 34 reads the history data of the selected binder from the optical disk 20a or 20b in step Y3 in FIG. 18. Also it determines whether or not the binder has been recorded on, or erased from, the disk 20a or 20b by means of any other filing system. If YES, the CPU 34 determines which reproduction mode has been set, the inhibit mode, the automatic mode, or the select mode in step Y4. If the reproduction mode is the inhibit mode, the CPU 34 inhibits the updating of the title table 60 and page table 61 of the desired binder. If the reproduction mode is the automatic mode, the CPU 34 updates the title table 60 and page table 61 of the binder automatically in step Y5. If the reproduction mode is the select mode, the CPU 34 causes the CRT display 24 to display the instruction message "DO YOU WANT TO INHIBIT THE UPDATING OF THE BINDER?" in step Y6. If the operator inputs "YES," the CPU 34 inhibits the updating of the tables 60 and 61. If the operator inputs "NO," the CPU 34 updates the tables 60 and 61 which are recorded on either the optical disk 21 or the magnetic disk 26, in accordance with the data items recorded in the areas e and f of the binder-format controlling table 65.

The CPU 34 reads the title format of the desired binder from the title-format controlling table 64, and causes the CRT display 24 to display the instruction message "INPUT RETRIEVAL DATA FOR THE IMAGE YOU WANT TO ERASE." In accordance with the message, the operator inputs the retrieval data defining the title format. The CPU 34 checks the title format, thus input, against the formats already defined.

Next, the CPU 34 compares the retrieval data with the retrieval data recorded on the title table 60 recorded on the optical disk 21 or the magnetic disk 26. The CPU 34 reads the titles, which are identified by the retrieval data items identical to the input retrieval data, from the disk 21 or 26. The CPU 34 stores the numbers of the retrieval data items read from the disk 21 or 26 into the main memory 38. Then, the CPU 34 reads the retrieval data items corresponding to these numbers, from the title table 60 recorded on the optical disk 21 or the magnetic disk 26. The CRT display 24 displays these retrieval data items.

The operator operates either the keyboard 23 or the mouse 29, thus selecting a desired title and a desired page or pages. The CPU 34 reads the addresses the title and the page from the title table 60 and page table 61 recorded on the optical disk 21 or the magnetic disk 26. It calculates the physical track address and physical sector address which correspond to the addresses read from the tables 60 and 61. The CPU 34 supplies the physical track address and the physical sector address to the optical disk device 22a or 22a. As a result of this, the disk device 22a or 22b reproduces the image data from the optical disk 20a or 20a.

The image data, reproduced from the disk 20a or 20b, is supplied, line by line, to the CODEC 50. The CODEC 50 band-expands the data, encoding the image data. The encoded image data is supplied to the display memory 42, and hence to the CRT display 24, whereby the CRT display 24 displays the image data.

The operator reviews the image data thus displayed by the CRT display 24. Upon recognizing that this data is the document or the page he or she wants to erase, the operator inputs an erase command. Then, the CPU 34 erases those data items recorded in the title table 60 and page table 61 which relate to the document or the page, thus updating the tables 60 and 61. The updated tables 60 and 61 are processed in the same way as in the case of registering image data.

Figure 16:
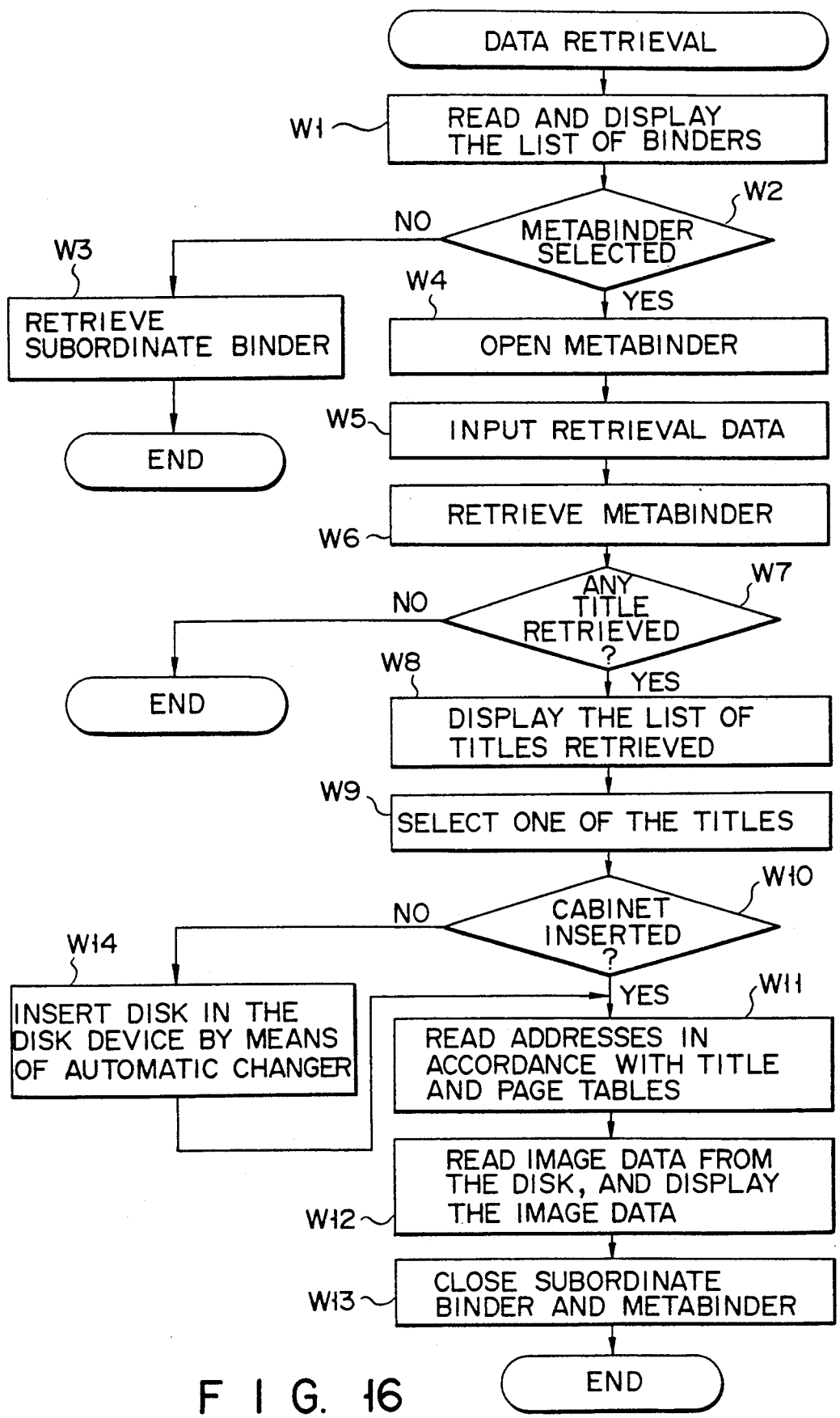
FIG. 16 is a flow chart explaining how image data is retrieved.

It will now be described how image data is retrieved from the optical disk 20a or 20b in FIG. 16. Let us assume that the CRT display 24 displays the menu image, and that the operator inserts an optical disk, i.e., a cabinet, into either the optical disk device 22a or 22b, and then operates the keyboard 23, thereby selecting the retrieve mode. Then, the CPU 34 reads the numbers of the metabinders and those of the subordinate binders from the binder-format controlling table 65. The metabinders are identified by the data items "0" recorded in the area b of the table 65, whereas the subordinate binders are identified by the data items "−1" also recorded in the area b of the table 65. The CPU 34 controls the CRT display 24 such that the display 24 displays the list of the binders, along with the instruction message "SELECT THE BINDER YOU WANT TO RETRIEVE" in step W1. If the operator selects one of the metabinders included in the list, which he wants to retrieve in step W2, the CPU 34 opens the metabinder selected in step W4. Next, the CPU 34 determines where the title-controlling table 62 for the selected metabinder is recorded, in accordance with the data items recorded in the title table presence/absence area e of the table 65. Also, the CPU 34 determines where the page-controlling table 63 for the selected metabinder is recorded, in accordance with the data items recorded in the page presence/absence area f of the table 65. As a result of this, data can be written in both tables 62 and 63. The CPU 34 determines that the tables 62 and 63 are recorded on the magnetic disk 26 if the data items recorded in the areas e and f are "1," and that the tables 62 and 63 are recorded on the optical disk 21 if the data items recorded in the area e are "2."

The CPU 34 reads the title format of the selected metabinder from the title-format controlling table 64, and causes the CRT display 24 to display the instruction message "INPUT RETRIEVAL DATA FOR THE IMAGE YOU WANT TO RETRIEVE" in step W5. As instructed, the operator inputs the retrieval data defining the title format. The CPU 34 checks the title format, thus input, against the title formats already defined.

Further in step W6, the CPU 34 compares the retrieval data with the retrieval data items recorded on the title-controlling table 62 stored in the optical disk 21 or the magnetic disk 26. The CPU 34 reads the titles in step W7, which are identified by the retrieval data items identical to the input retrieval data, from the disk 21 or 26. The CPU 34 stores the numbers of these retrieval data items into the main memory 38. Then, the CPU 34 reads the retrieval data items corresponding to these numbers, from the optical disk 21 or the magnetic disk 26. The CRT display 24 displays these retrieval data items in step W8. If the retrieval data items are recorded in the title-controlling table 62 in alphabetical order, they can be retrieved from the table 62 faster than in the case where the retrieval data items are recorded in the order the corresponding image data items have been registered.

The operator reviews the retrieval data items displayed by the CRT display 24, and operates either the keyboard 23 or the mouse 29, thus selecting a desired title and and a desired page or pages in step W9. The CPU 34 determines whether or not the optical disk (i.e., the cabinet) which stores the desired title and page is inserted in the optical disk device 22a or 22b in step W10. If the optical disk is set in the device 22a or 22b, the CPU 34 reads the addresses of the title and the page from the title-controlling table 62 and page-controlling table 63 recorded on the optical disk 21 or the magnetic disk 26 in step W11. It calculates the physical track address and physical sector address which correspond to the addresses read from the tables 62 and 63. The CPU 34 supplies the physical track address and the physical sector address to the optical disk device 22a or 22a. As a result of this, the disk device 22a or 22b reproduces the image data from the optical disk 20a or 20a in step W12.

The image data, reproduced from the disk 20a or 20b, is supplied, line by line, to the CODEC 50. The CODEC 50 band-expands the data, encoding the image data. The encoded image data is supplied to the display memory 42, and hence to the CRT display 24, whereby the CRT display 24 displays the image data.

If the optical disk storing the selected metabinder is not inserted in the optical disk device 22a or 22b, the CPU 34 causes the automatic changer (not shown) to insert the optical disk into the device 22a or 22b in step W14. Alternatively, the CPU 34 causes the CRT display 24 to specify the optical disk which should be inserted, and also the device 22a or 22b into which the specified disk should be inserted. The operator therefore inserts the specified optical disk into the specified optical disk device. Then, the CPU 34 performs the same operations as in the case where the optical disk is inserted in the disk device from the beginning.

If the operator selects one of the subordinate binders included in the list displayed by the CRT display 24 in step W2, which he wants to retrieve, any image data filed in the selected subordinate binder can be retrieved in accordance with the corresponding title table 60 and page table 61, in the same way as any desired image data filed in a metabinder is retrieved in accordance with the title-controlling table 62 and the page-controlling table 63 in step W3.

Figure 17:
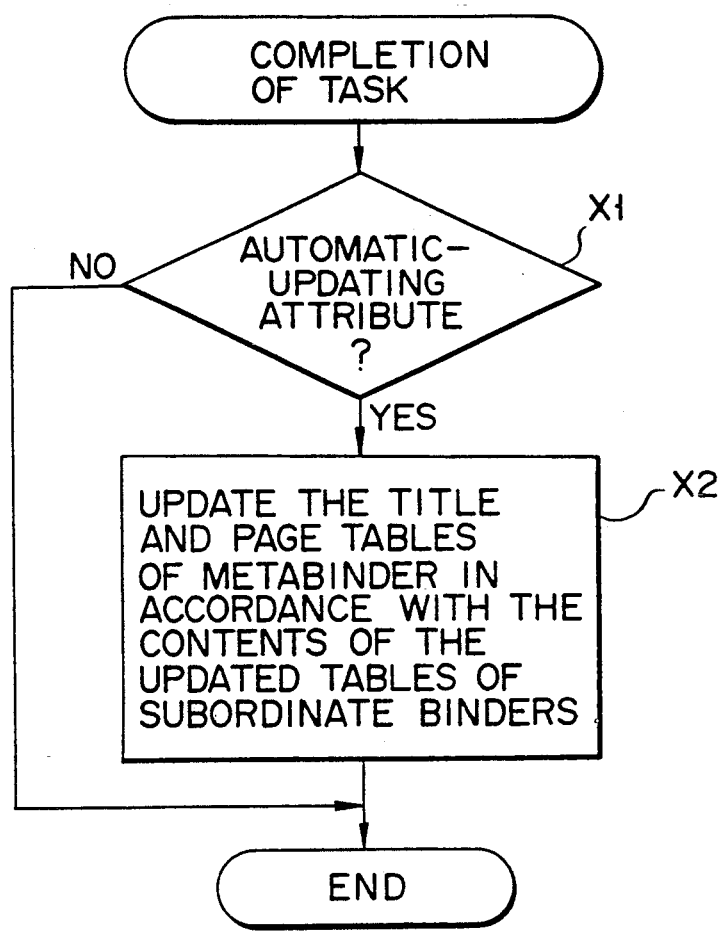
FIG. 17 is a flow chart explaining how to complete one task with the filing system.

Upon completion of the registration, erasure, or retrieval of any image data, or upon completion of one task of the filing system, the CPU 34 updates the title table 60 and page table 60 of any subordinate binder that has updating attribute of "1", and also the title-controlling table 62 and page-controlling table 63 of any metabinder that has updating attribute of "1." (Either updating attribute is recorded in the area f of the title-format controlling table 65) as shown in steps X1 and X2 in FIG. 17. The tables 60, 61, 62, and 63, thus updated, are stored at such locations defined as has been explained above, and in such formats defined as has been described above.

It will be explained how image data is retrieved at each of the terminal devices 1a, 1b, .... First, the operator at the terminal device reviews the operation menu the CRT display 124 displays, and operates the keyboard 123, selecting the retrieving mode. Then, the CPU 134 is connected to the CPU 34 of the central device 3 by means of the communication control module 116, the communication line 2, and the communication control module 16. Hence, the terminal device gains an access to the central device 3.

In the central device 3, the CPU 34 reads the metabinders and the subordinate binders from the optical disk 20a or 20b. The data representing the list of the metabinders and the data showing the list of the subordinate binders are transmitted from the central device 3 to the terminal device through the communication line 2. The CPU 134 causes the CRT display 124 to display the list of the metabinders and the list of the subordinate binders, along with the instruction message "WHICH DO YOU WANT TO RETRIEVE, METABINDER OR SUBORDINATE BINDER?" If the operator at the terminal device operates the keyboard 123, thus selecting one of the metabinders. The data designating the selected metabinder is transmitted to the central device 3 via the communication line 2. Upon receipt of this data, the CPU 34 opens the selected metabinder. More specifically, the CPU 34 determines where the title-controlling table 62 for the selected metabinder is recorded, in accordance with the data items recorded in the title table presence/absence area e of the table 65. Also, the CPU 34 determines where the page-controlling table 63 for the selected metabinder is recorded, in accordance with the data items recorded in the page presence/absence area f of the table 65. As a result of this, data can be written in both tables 62 and 63. The CPU 34 determines that the tables 62 and 63 are recorded on the magnetic disk 26 if the data items recorded in the areas e and f are "1," and that the tables 62 and 63 are recorded on the optical disk 21 if the data items recorded in the area e are "2."

The CPU 34 reads the title format of the selected metabinder from the title-format controlling table 64. Then, the CPU 34 transmits the data representing the message "INPUT RETRIEVAL DATA FOR THE IMAGE YOU WANT TO RETRIEVE" to the display memory 142 through the communication control module 16, the communication line 2, and the communication control module 116. As a result, the CRT display 124 of the terminal device displays this message. As instructed, the operator at the terminal device operates the keyboard 123, inputting the retrieval data defining the title format. The CPU 134 checks the title format, thus input, against the title formats already defined. If the title format is identical to any one of the formats already defined, the retrieval data is transmitted to the CPU 34 via the control module 116, the communication line 2, and the control module 162.

In the central device 3, the CPU 34 compares the retrieval data, which has been transmitted from the terminal device, with the retrieval data items recorded on the title-controlling table 62 stored in the optical disk 21 or the magnetic disk 26. The CPU 34 reads the titles, which are identified by the retrieval data items identical to the retrieval data, from the optical disk 21 or the magnetic disk 26. The CPU 34 stores the numbers of these retrieval data items into the main memory 38. Then, the CPU 34 reads the retrieval data items corresponding to these numbers, from the optical disk 21 or the magnetic disk 26. These retrieval data items are transmitted to the display memory 142 of the terminal device through the module 16, the line 2, and the module 116. The CRT display 124 displays these retrieval data items. If the retrieval data items are recorded in the title-controlling table 62 in alphabetical order, they can be retrieved from the table 62 faster than in the case where the retrieval data items are recorded in the order the corresponding image data items have been registered.

The operator at the terminal device reviews the retrieval data items displayed by the CRT display 124, and operates either the keyboard 23 or the mouse 29, thus selecting a desired title and a desired page or pages. The CPU 134 transmits the data designating the desired title and the desired page to the CPU 34 of the central terminal 3 through the module 116, the line 2, and the module 16.

In the central terminal 3, the CPU 34 determines whether or not the optical disk (i.e., the cabinet) which stores the desired title and page is inserted in the optical disk device 22a or 22b. If the optical disk is set in the device 22a or 22b in step Y2, the CPU 34 reads the addresses of the title and the page from the title-controlling table 62 and page-controlling table 63 recorded on the optical disk 21 or the magnetic disk 26. It calculates the physical track address and physical sector address which correspond to the addresses read from the tables 62 and 63. The CPU 34 supplies the physical track address and the physical sector address to the optical disk device 22a or 22a. As a result of this, the disk device 22a or 22b reproduces the image data from the optical disk 20a or 20a in step Y2.

The image data, reproduced from the disk 20a or 20b, is supplied, line by line, to the CODEC 50. The CODEC 50 band-expands the data, encoding the image data. The encoded image data is supplied to the page memory 40. Every time one page of image data is stored into the page memory 40, the CPU 34 transmits the one-page image data to the display memory 142 of the terminal device via the module 16, the line 2, and the module 116. Hence, the CRT display 124 of the terminal device displays the one-page image data.

In the central device 3, if the optical disk storing the selected metabinder is not inserted in the optical disk device 22a or 22b, the CPU 34 causes the automatic changer (not shown) to insert the optical disk into the device 22a or 22b. Alternatively, the CPU 34 causes the CRT display 24 to specify the optical disk which should be inserted, and also the device 22a or 22b into which the specified disk should be inserted. The operator therefore inserts the specified optical disk into the specified optical disk device. Then, the CPU 34 performs the same operations as in the case where the optical disk is inserted in the disk device from the beginning.

If the operator at the terminal device selects one of the subordinate binders included in the list displayed by the CRT display 124, which he or she wants to retrieve, any image data filed in the selected subordinate binder can be retrieved in accordance with the corresponding title table 60 and page table 61, in the same way as any desired image data filed in a metabinder is retrieved in accordance with the title-controlling table 62 and the page-controlling table 63.

Image data can be retrieved in any terminal device while the data is being registered, erased, or retrieved in the central device 3, unless it is filed in the same binder from which the data is being retrieved in the central device. The image data can be retrieved in the terminal device even if it is filed in the same binder.

As has been described above, in the electronic filing system, a plurality of images are recorded on a magnetic disk, in the form of four hierarchical classes, i.e., cabinets, binders, documents, and pages, and a plurality of retrieval data items are recorded on an optical disk, in the form of a plurality of keys assigned to the individual images. The system comprises mode-selecting means, detection means, and data-processing means. The mode-selecting means selects one of reproduction modes such as an inhibit mode, an automatic mode, or a select mode. Upon insertion of the optical disk, the detection means determines, based on the history data recorded on the optical disk, whether or not the contents of the optical disk have been updated by another electronic filing system. The data-processing means inhibits updating of the title and page tables recorded on the magnetic disk when the mode-selecting means selects the inhibit mode. It updates the title and page tables recorded on the magnetic disk when the mode-selecting means selects the automatic mode. It either inhibits or permits the updating of the retrieval data items when the mode-selecting means selects the select mode, provided that the detecting means determines that the contents of the optical disk have been updated.

Hence, an operator can update or maintain the title table and the page table, both recorded on a magnetic disk, at his or her discretion, when an optical disk is inserted in the optical disk device thereby to open any desired binder.

As can be understood from the above, the present invention can provide an electronic filing system, wherein, when a first recording medium on which binders are recorded is inserted in a medium-driving device, and one of the binders is opened, the retrieval data items recorded on a second recording medium can either be updated or maintained at an operator's discretion.

Additional advantages and modifications will readily occur to those skilled in the art. Therefore, the invention in its broader aspects is not limited to the specific details, representative devices, shown and described herein. Accordingly, various modifications may be made without departing from the spirit or scope of the general inventive concept as defined by the appended claims and their equivalents.

I claim:

1. An electronic filing system for retrieving images recorded on a recording medium by using retrieval data which is updated in accordance with change of the images, comprising:

mode selecting means for selecting one reproduction modes including an inhibit mode, an automatic mode and a select mode, said mode selecting means including a keyboard having keys for designating the inhibit mode, the automatic mode and the select mode, means for generating a signal designating one of the reproduction modes selected by operating one of said keys, and memory means for storing the signal designating the selected reproduction mode;

determining means for determining whether or not memory contents recorded on the recording medium have been changed by another electronic filing system; and data processing means of inhibiting updating of the retrieval data when said mode selecting means selects the inhibit mode, for updating the retrieval data when said mode selecting means selects the automatic mode, and for determining whether or not the updating of the retrieval data is performed when said mode selecting means selects the select mode, provided that said determining means determines that the memory contents of the recording medium have been changed.

2. An electronic filing system for retrieving images recorded on a recording medium by using retrieval data which is updated in accordance with change of the images, comprising:

mode selecting means for selecting one of first, second and third image reproduction modes;

determining means for determining whether or not memory contents recorded on the recording medium have been changed by another electronic filing system, said determining means including means for recording, on said recording medium, history data concerning changing of data recorded on said recording medium, means for reading the updating history data from said recording medium, and means for determining whether or not the history data represents data recorded on said recording medium has been changed; and data processing means for inhibiting updating of the retrieval data when said mode selecting means selects the first mode, for updating the retrieval data when said mode selecting means selects the second mode, and for determining whether or not the updating of the retrieval data is performed when said mode selecting means selects the third mode, provided that said determining means determines that the memory contents of the recording medium have been changed.

3. The system according to claim 2, wherein said recording medium includes first memory means for recording said images and second memory means for recording said retrieval data.

4. The system according to claim 3, wherein said first memory means includes an optical disk and said second memory means includes a magnetic disk.

5. The system according to claim 3, wherein said first memory means have a memory structure for storing said images in the form of four hierarchical classes of cabinets, binders, documents and pages.

6. The system according to claim 3, further comprising:

means for reading the retrieval data items from said second recording medium when said data processing means inhibits the updating of a retrieval data items recorded on said second recording medium; and means for retrieving desired image data from the first recording medium in accordance with the retrieval data items read from said second recording medium.

7. An electronic filing system comprising:

an optical disk for optically recording a plurality of images;

magnetic memory means for recording a plurality of retrieval data which are to be used to retrieve the images from said optical disk;

mode selecting means for selecting one of an automatic mode, an inhibit mode and a select mode, said automatic mode being to update the retrieval data automatically when the images recorded on the optical disk have been changed, said inhibit mode being to inhibit the automatic updating of the retrieval data, and said select mode being to inhibit the automatic updating of the retrieval data; and data processing means for reproducing the retrieval data directly from said magnetic memory means.

8. The system according to claim 7, wherein said mode selecting means comprises:

a keyboard having keys for designating the inhibit mode, the automatic mode, and the select mode;

means for generating a signal designating one of the reproduction modes selected by depressing one of said keys; and means for storing the signal designating the selected reproduction mode.

9. The system according to claim 8, wherein said storing means is provided in said magnetic memory means.

10. The system according to claim 8, wherein said storing means is provided on said optical disk.

11. An electronic filing system comprising:

a first memory means for recording a plurality of images;

a second memory means for recording a plurality of retrieval data which are to be used to retrieve the images from said first memory means;

mode selecting means of selecting one of an automatic mode, an inhibit mode and a select mode, said automatic mode being to update the retrieval data automatically when the images recorded on the first memory means have been changed, said inhibit mode being to inhibit the automatic updating of the retrieval data, and said select mode being to inhibit the automatic updating of the retrieval data; and data processing means for reproducing the retrieval data directly from said second memory means.

* * * * *